US012597970B2

(12) United States Patent
Huang et al.

(10) Patent No.: US 12,597,970 B2
(45) Date of Patent: Apr. 7, 2026

(54) HYBRID MULTIPLE-INPUT MULTIPLE-OUTPUT (MIMO) PRECODER CODEBOOK BASED ON DISCRETE FOURIER TRANSFORM (DFT) AND NON-DFT PRECODERS

(71) Applicant: QUALCOMM Incorporated, San Diego, CA (US)

(72) Inventors: Yi Huang, San Diego, CA (US); Yu Zhang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 18/500,005

(22) Filed: Nov. 1, 2023

(65) Prior Publication Data

US 2024/0171233 A1 May 23, 2024

Related U.S. Application Data

(60) Provisional application No. 63/382,709, filed on Nov. 7, 2022.

(51) Int. Cl.
H04B 7/0456 (2017.01)
H04B 7/06 (2006.01)
H04L 27/26 (2006.01)

(52) U.S. Cl.
CPC ......... *H04B 7/0478* (2013.01); *H04B 7/0486* (2013.01); *H04B 7/0686* (2013.01); *H04L 27/2649* (2013.01)

(58) Field of Classification Search
CPC .. H04B 7/0486; H04B 7/0478; H04B 7/0686; H04L 27/2649
See application file for complete search history.

(56) References Cited

U.S. PATENT DOCUMENTS

| | | | |
|---|---|---|---|
| 2012/0082190 A1* | 4/2012 | Zhu | H04B 7/063 375/267 |
| 2014/0016549 A1 | 1/2014 | Novlan et al. | |
| 2014/0072065 A1* | 3/2014 | Nammi | H04B 7/0639 375/267 |
| 2018/0183503 A1 | 6/2018 | Rahman et al. | |
| 2020/0100327 A1 | 3/2020 | Zhang et al. | |

FOREIGN PATENT DOCUMENTS

EP 3609086 A1 2/2020

OTHER PUBLICATIONS

International Search Report and Written Opinion—PCT/US2023/036717—ISA/EPO—Feb. 14, 2024.

* cited by examiner

*Primary Examiner* — Rahel Guarino
(74) *Attorney, Agent, or Firm* — Procopio, Cory, Hargreaves & Savitch

(57) ABSTRACT

A user equipment (UE) precodes data for transmission by the wireless device based on a hybrid codebook comprising a first set of one or more discrete Fourier transform (DFT) precoders and a second set of one or more non-DFT precoders. The UE also transmits a signal based on the precoded data.

30 Claims, 14 Drawing Sheets

1100

1102

Precode data for transmission by the wireless device based on a hybrid codebook comprising a first set of one or more discrete Fourier transform (DFT) precoders and a second set of one or more non-DFT precoders

1104

Transmit a signal based on the precoded data

Pure DFT codebook for 4 Tx in one polarization $$
\begin{bmatrix}
1 & \dfrac{\sqrt{2}+j\sqrt{2}}{2} & 1 & \dfrac{-\sqrt{2}+j\sqrt{2}}{2} & 1 & \dfrac{-\sqrt{2}-j\sqrt{2}}{2} & 1 & \dfrac{\sqrt{2}-j\sqrt{2}}{2} \\
1 & j & j & -j & -1 & -j & -j & -j \\
1 & \dfrac{-\sqrt{2}+j\sqrt{2}}{2} & -1 & \dfrac{\sqrt{2}+j\sqrt{2}}{2} & 1 & \dfrac{-\sqrt{2}-j\sqrt{2}}{2} & -1 & \dfrac{\sqrt{2}-j\sqrt{2}}{2} \\
1 & -j & -j & -j & -1 & -j & j & j
\end{bmatrix}
$$

602   604   606   608   610   612   614   616

600

502a   502b   502c   502d 0   1   2   3

4   5   6   7

0.5 λ

—— Polarization 1

------ Polarization 2

500

800

Hybrid codebook (DFT + non-DFT precoders) for 4 Tx in one polarization

| Rank | Codebook for a rank |
|------|---------------------|
| 1 | Hybrid codebook (4 DFT precoders + 4 non-DFT precoders) |
| 2 | Hybrid codebook (8 DFT precoders + 6 non-DFT precoders) |
| 3 | Hybrid codebook (8 DFT precoders + 6 non-DFT precoders) |
| 4 | Hybrid codebook (8 DFT precoders + 6 non-DFT precoders) |
| 5 | Pure DFT precoders (8 DFT precoders) |
| 6 | Pure non-DFT precoders (2 non-DFT precoders) |
| 7 | Pure non-DFT precoders (2 non-DFT precoders) |
| 8 | Pure non-DFT precoders (2 non-DFT precoders) |

| Rank | Codebook for a rank |
|---|---|
| 1 | Pure DFT precoders (8 DFT precoders) |
| 2 | Hybrid codebook (8 DFT precoders + 8 non-DFT precoders) |
| 3 | Hybrid codebook (8 DFT precoders + 6 non-DFT precoders) |
| 4 | Hybrid codebook (8 DFT precoders + 6 non-DFT precoders) |
| 5 | Pure DFT precoders (8 DFT precoders) |
| 6 | Pure non-DFT precoders (2 non-DFT precoders) |
| 7 | Pure non-DFT precoders (1 non-DFT precoder) |
| 8 | Pure non-DFT precoders (1 non-DFT precoder) |

Precode data for transmission by the wireless device based on a hybrid codebook comprising a first set of one or more discrete Fourier transform (DFT) precoders and a second set of one or more non-DFT precoders

1104

Transmit a signal based on the precoded data

1100

HYBRID MULTIPLE-INPUT MULTIPLE-OUTPUT (MIMO) PRECODER CODEBOOK BASED ON DISCRETE FOURIER TRANSFORM (DFT) AND NON-DFT PRECODERS

CROSS REFERENCE TO RELATED APPLICATION(S)

This application claims the benefit of and priority to U.S. Provisional Application Ser. No. 63/382,709, entitled "A Hybrid Multiple-Input Multiple-Output (MIMO) Precoder Codebook Based on Discrete Fourier Transform (DFT) and Non-DFT Precoders" and filed on Nov. 7, 2022, which is expressly incorporated by reference herein in its entirety.

TECHNICAL FIELD

The present disclosure relates generally to communication systems, and more particularly, to wireless communications utilizing codebooks for precoding data transmissions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a wireless device. The apparatus may include memory and at least one processor coupled to the memory and, based at least in part on information stored in the memory, the at least one processor may be configured to precode data for transmission by the wireless device based on a hybrid codebook including a first set of one or more discrete Fourier transform (DFT) precoders and a second set of one or more non-DFT precoders and to transmit a signal based on the precoded data.

In an aspect of the disclosure, a method, a computer-readable medium, and an apparatus are provided for wireless communication at a network node. The apparatus may include memory and at least one processor coupled to the memory and, based at least in part on information stored in the memory, the at least one processor may be configured to provide a subset of precoders for a hybrid codebook including at least one DFT precoder and at least one non-DFT precoder and to communicate with a user equipment (UE) with precoding based on the hybrid codebook.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 9A illustrates a table depicting various types of codebooks used for different ranks, in accordance with various aspects of the present disclosure.

FIG. 9B illustrates a table depicting various types of codebooks used for different ranks, in accordance with various aspects of the present disclosure.

DETAILED DESCRIPTION

Figure 1:
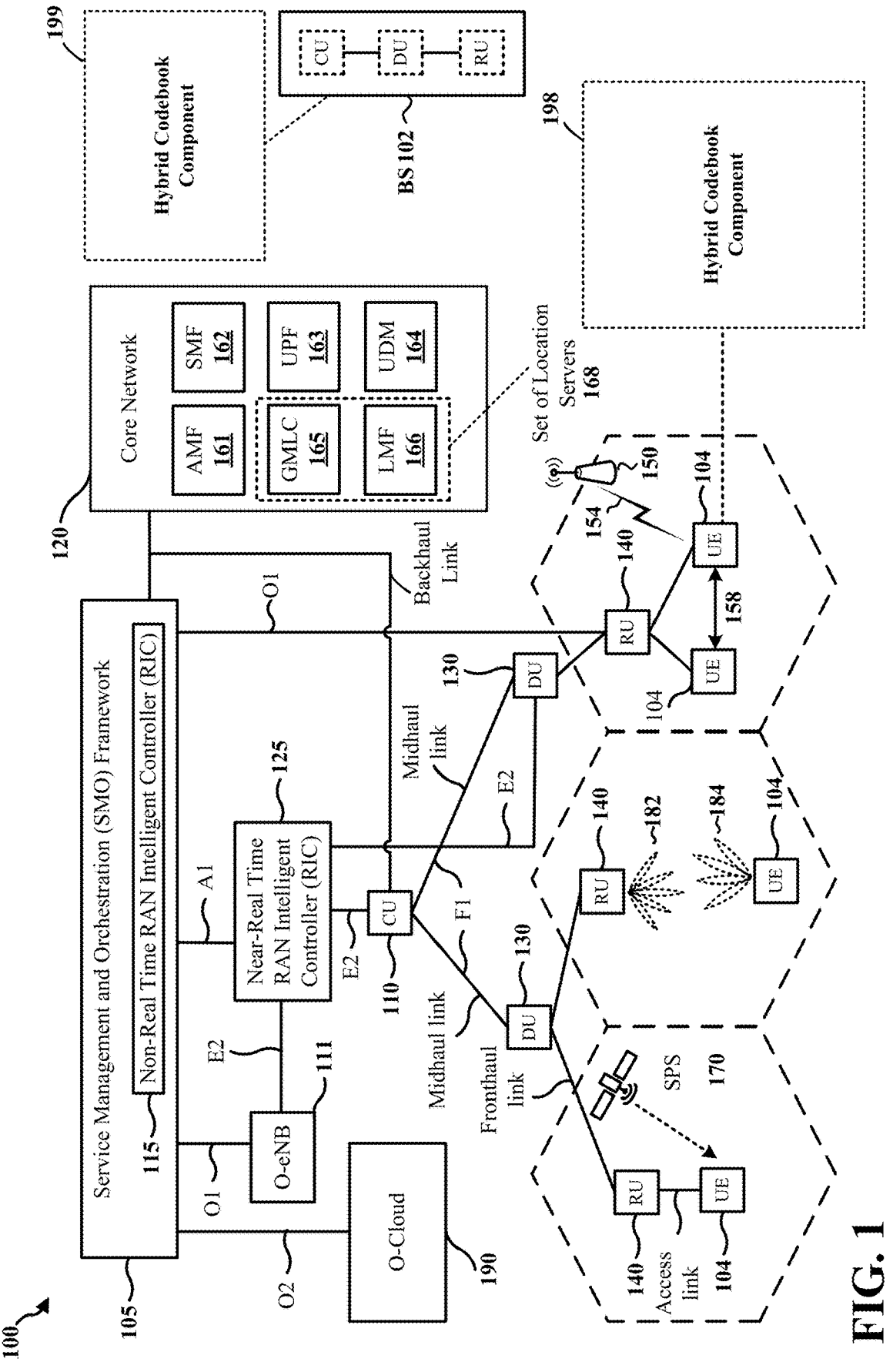
FIG. 1 is a diagram illustrating an example of a wireless communications system and an access network.

As wireless communication technologies evolve, additional types of UEs may be supported including UEs with multiple antennas. Some UEs may be referred to as "advanced UEs," which may include smartphones, indoor Customer Premises Equipment (CPE), outdoor CPEs, Fixed Wireless Access (FWA) CPEs, vehicles, industrial devices, laptops, larger sized devices, etc. As an example, advanced UEs may be associated with higher reliability and/or improved efficiency than non-advanced UEs. Advanced UEs may include multiple antenna elements, including four antennas or more than four antennas, such as eight antenna elements, among other examples. The UEs may support greater than four downlink layers and/or four uplink transmit ports. Advanced UEs may also support Demodulation Reference Signal (DMRS), Sounding Reference Signal (SRS), and/or codebook designs.

An increased quantity of transmit antennas (Tx) (e.g., greater than four transmit antennas) are being considered for advanced UEs (e.g., mobile devices, larger-sized devices, etc.), and the support of 8-port transmissions (e.g., uplink transmissions, downlink transmissions, or sidelink transmissions) may improve wireless communication performance.

Aspects presented herein provide for methods and apparatus for a hybrid codebook that utilizes both DFT precoders and non-DFT precoders. In some aspects, a wireless device may precode data for transmission by the wireless device based on a hybrid codebook including a first set of DFT precoders and a second set of one or more non-DFT precoders and may transmit a signal based on the precoded data. In other aspects, a network node may provide a subset of precoders for a hybrid codebook including at least one DFT precoder and at least one non-DFT precoder and may communicate with a UE with precoding based on the hybrid codebook. By supporting both types of precoders, a UE or network node may optimally select a precoder based on whether a phase offset or error at a particular UE exists. For instance, if no (or relatively low) phase offset or error exists, then the UE or network node may select a DFT precoder from the hybrid codebook. However, if a relatively high phase offset or error exists, then the UE or network node may select a non-DFT precoder from the hybrid codebook. The methods and apparatus of aspects of the present disclosure may advantageously improve performance and spectral efficiency during the transmission of data regardless of phase offset or error.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (MC) 125 via an E2 link, or a Non-Real Time (Non-RT) RIC 115 associated with a .vice Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs (e.g., 104) via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEsb 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to include a hybrid codebook component 198 configured to precode data for transmission by the wireless device based on a hybrid codebook including a first set of one or more DFT precoders and a second set of one or more non-DFT precoders and to transmit a signal based on the precoded data. In certain aspects, the base station 102 may be configured to include a hybrid codebook component 199 configured to precode data for transmission by the wireless device based on a hybrid codebook including a first set of one or more DFT precoders and a second set of one or more non-DFT precoders and to transmit a signal based on the precoded data. In certain aspects, the hybrid codebook component 199 may be configured to provide a subset of precoders for a hybrid codebook including at least one DFT precoder and at least one non-DFT precoder and to communicate with a UE with precoding based on the hybrid codebook. Although the following description may be focused on 5G NR, the concepts described herein may be applicable to other similar areas, such as LTE, LTE-A, CDMA, GSM, and other wireless technologies.

Figures 2A, 2B, 2C, 2D:
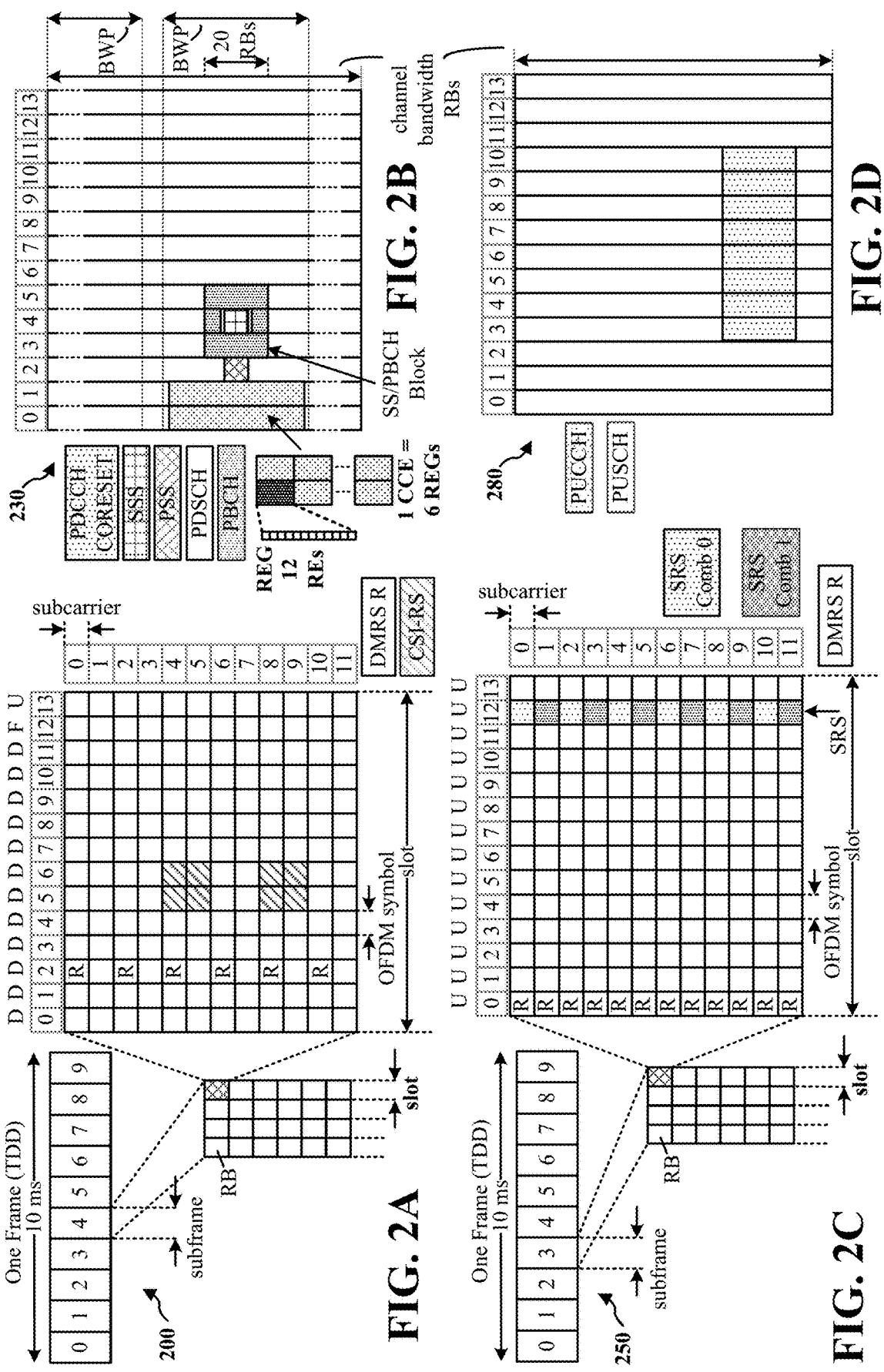
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| μ | SCS $\Delta f = 2^\mu \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
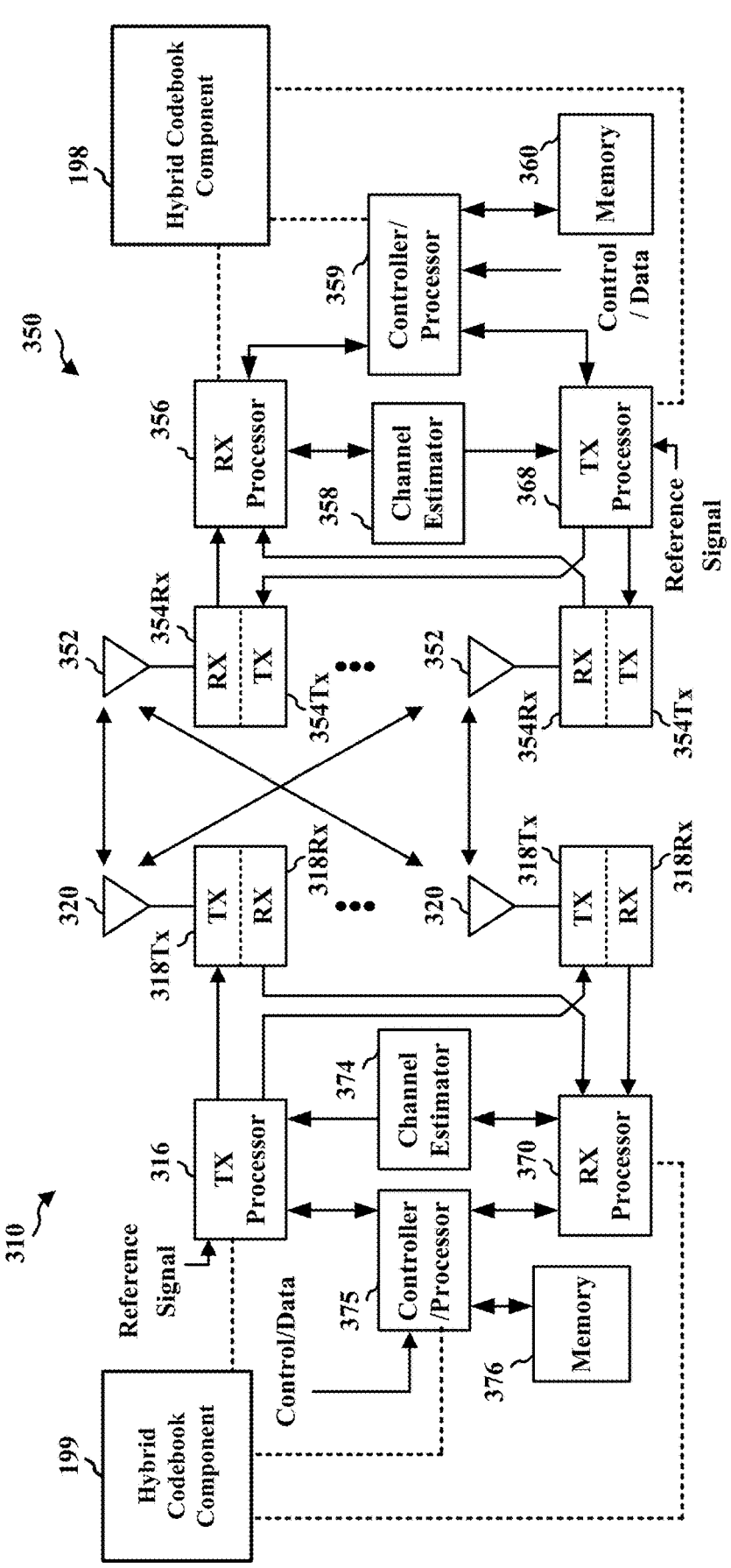
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs) RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the hybrid codebook component 198 of FIG. 1.

At least one of the TX processor 316, the RX processor 370, and the controller/processor 375 may be configured to perform aspects in connection with the hybrid codebook component 199 of FIG. 1.

Figure 4:
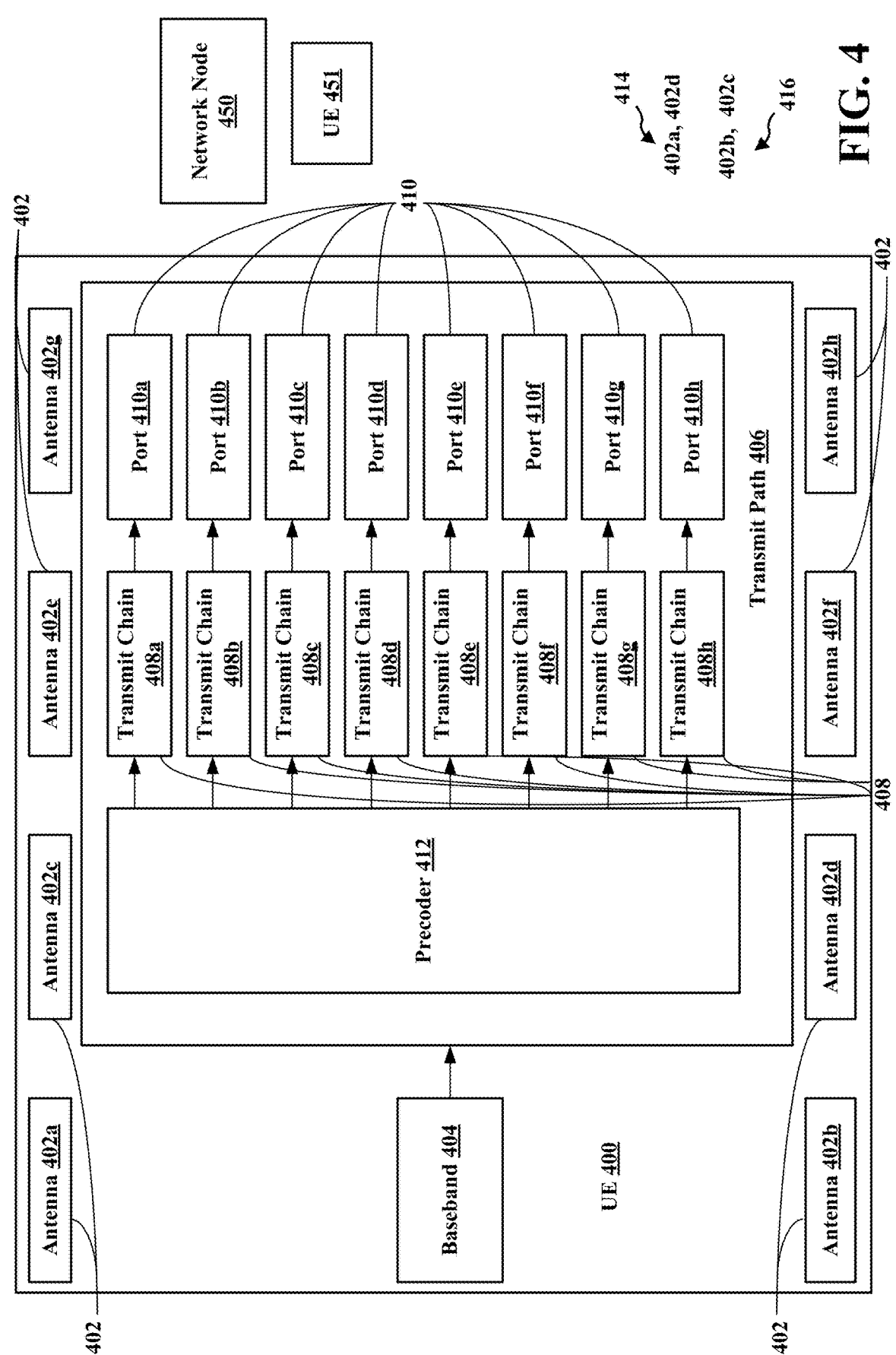
FIG. 4 illustrates an example UE in communication with a network node 450, in accordance with various aspects of the present disclosure.

FIG. 4 illustrates an example UE 400 in communication (e.g., uplink transmission and downlink reception) with a network node 450, as presented herein. In some aspects, the UE 400 may be in communication with a second UE 451, e.g., using sidelink communication. The UE 400 may be similar to the UE 104 of FIG. 1 and/or the UE 350 of FIG. 3. The network node 450 may be similar to the base station 102, or a component of the base station 102, such as the CU 110, the DU 130, and/or the RU 140 of FIG. 1.

The example UE 400 may include multiple antenna elements. In FIG. 4, the example UE 400 includes eight antenna elements (e.g., a first antenna element 402a, a second antenna element 402b, a third antenna element 402c, a fourth antenna element 402d, a fifth antenna element 402e, a sixth antenna element 402f, a seventh antenna element 402g, and an eighth antenna element 402h). The antenna elements may be collectively referred to herein as "antenna elements 402." An antenna element may be referred to as an antenna, an antenna port, or a port. Although the example UE 400 is illustrated as having eight antenna elements, in other examples, the UE may include fewer antenna elements or more antenna elements.

In the illustrated example of FIG. 4, the antenna elements 402 are located on different parts of the UE 400, thus creating diversity and providing for directional communication. The UE 400 may use at least one of the antenna elements 402 to transmit communication signals (e.g., SRS signals) to enable the network node 450 to estimate an uplink channel. The UE 400 includes a baseband 404 and a transmit path 406 for uplink transmissions using one or more of the antenna elements 402. Aspects of the baseband 404 may be implemented by the TX processor 368 and/or the processor 359 of the UE 350 of FIG. 3. The transmit path 406 includes eight example transmit chains (e.g., a first transmit chain 408a, a second transmit chain 408b, a third transmit chain 408c, a fourth transmit chain 408d, a fifth transmit chain 408e, a sixth transmit chain 408f, a seventh transmit chain 408g, and an eighth transmit chain 408h). A transmit chain also be referred to as an RF chain. The transmit chains of the UE 400 may be collectively referred to as "transmit chains 408" herein. Although the example UE 400 is illustrated as having eight transmit chains, in other examples, the UE may include fewer transmit chains or more transmit chains. Each transmit chain may be configured to convert a baseband signal to an RF signal for transmission.

The UE 400 may sound a port by sending an SRS using a combination of transmit chains. In the example of FIG. 4, the UE 400 includes eight example ports 410 (e.g., a first port 410a, a second port 410b, a third port 410c, a fourth port 410d, a fifth port 410e, a sixth port 410f, a seventh port 410g, and an eighth port 410h). The ports may be collectively referred to herein as "ports 410." Although the example UE 400 is illustrated as having eight ports, in other examples, the UE may include fewer ports or more ports.

The UE 400 may support three levels of coherence: full coherence, partial coherence, non-coherence. A UE with full coherence may be referred to as a fully-coherent UE and may transmit coherently over all of the antenna elements 402. A fully-coherent UE has the ability to control the relative phase between the transmit chains 408 of the UE 400. Two antenna elements maintain a relative phase if the phases across these two antennas are locked and/or remain the same across uplink transmissions.

A UE with partial coherence may be referred to as a partially-coherent UE and may transmit coherently over pairs of antenna elements. A partially-coherent UE has the ability to maintain a relative phase across multiple subsets of the antenna elements 402. For example, a first coherent antennas pair 414 may include the first antenna element 402*a* and the fourth antenna element 402*d* and a second coherent antennas pair 416 may include the second antenna element 402*b* and the third antenna element 402*c*. The antenna elements of the respective coherent antenna pairs may be coherent antennas relative to each other and may maintain a relative phase across the two respective antenna elements. However, the partially-coherent UE may be unable to maintain phase coherence across these two pairs.

A UE with non-coherence may be referred to as a non-coherent UE and may not be able to transmit coherently over any pairs or sets of antenna elements. For example, a non-coherent UE may lack the ability to maintain a relative phase across any of the antenna elements 402.

In the example of FIG. 4, the UE 400 may support multi-layer uplink transmissions. For a non-coherent UE, each layer of the multi-layer uplink transmission is sent to a single antenna element of the antenna elements 402 and there is no combining across layers. For a partially-coherent UE, certain antenna elements are combined and each layer is sent to multiple ports. A partially-coherent UE may be configured as a partially-coherent 2Tx (PC-2) UE or a partially-coherent 4Tx (PC-4) UE. For a PC-2 UE, each layer of the uplink transmission is sent to two antenna elements of the antenna elements 402, and for a PC-4 UE, each layer of the uplink transmission is sent to four antenna elements of the antenna elements 402. For a fully-coherent UE, each layer is sent to each of the antenna elements 402.

The UE 400 may be configured to apply a precoder 412 across all subbands of an uplink transmission or may be configured to apply a plurality of precoders for a plurality of subbands across the uplink transmission. The network node 450 may configure the UE 400 with one or more precoder configurations. Additionally, or alternatively, the network node 450 may activate a precoder configuration at the UE 400. The UE 400 may receive the precoder configuration via RRC signaling, downlink control information (DCI), and/or a medium access control-control element (MAC-CE).

Figure 5:
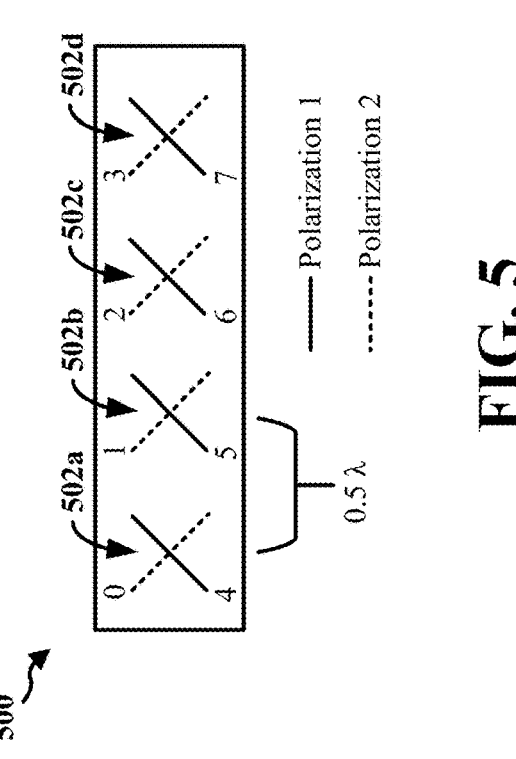
FIG. 5 illustrates a diagram of a unified linear array antenna layout.

In certain aspects, a wireless device including 8 Tx ports may utilize four antennas, each having two polarizations (or dimensions), thereby resulting in 8 total ports. For example, FIG. 5 illustrates a diagram 500 of a unified linear array antenna layout. As shown in FIG. 5, the layout includes four antennas 502*a*, 502*b*, 502*c*, and 502*d* that are linearly arranged. Each of the antennas 502*a*, 502*b*, 502*c*, and 502*d* may have a first polarization and a second polarization and may be equally spaced apart by a distance of 0.5λ, (i.e., the wavelength of the RF waveform that is transmitted from each of the antennas 502*a*, 502*b*, 502*c*, and 502*d*).

Figure 6:
FIG. 6 illustrates a diagram of a discrete Fourier transform (DFT)-based codebook (or matrix) including a plurality of precoders.

When a device utilizes a one dimensional (1D) or two dimensional (2D) unified linear array antenna layout, DFT-based MIMO precoders may be utilized for their effectiveness. FIG. 6 illustrates a diagram 600 of a DFT-based codebook (or matrix) including a plurality of precoders (also referred herein as codepoints). As shown in FIG. 6, an oversampling factor of 2 has been applied. Thus, the DFT-based codebook includes 8 columns (as opposed to 4 columns), where each column represents a different rank-1 DFT precoder. On each polarization, a DFT precoder is selected from a column of the DFT matrix. Each row represents a particular Tx port (e.g., each having two polarizations). As shown in FIG. 6, the first column 602 is a DFT precoder including a DFT vector of 1, 1, 1, 1 and having a phase ramp equal to 0. The second column 604 is a DFT precoder including a DFT vector of 1, $\sqrt{2}+j\sqrt{2}/2$, j, $-\sqrt{2}+j\sqrt{2}/2$ and having a phase ramp equal to π/4. The third column 606 is a DFT precoder including a DFT vector of 1, j, −1, −j and having a phase ramp equal to π/12. The fourth column 608 is a DFT precoder including a DFT vector of 1, $$\frac{-\sqrt{2}+j\sqrt{2}}{2}, -j, \frac{\sqrt{2}+j\sqrt{2}}{2}$$

and having a phase ramp equal to 3π/4. The fifth column 610 is a DFT precoder including a DFT vector of 1, −1, 1, −1 and having a phase ramp equal to π. The sixth column 612 is a DFT precoder including a DFT vector of 1, $$\frac{-\sqrt{2}-j\sqrt{2}}{2}, j, \frac{\sqrt{2}-j\sqrt{2}}{2}$$

and having a phase ramp equal to 5π/4. The seventh column 614 is a DFT precoder including a DFT vector of 1, −j, −1, j and having a phase ramp equal to 6π/4. The eighth column 616 is a DFT precoder including a DFT vector of 1, $$\frac{\sqrt{2}-j\sqrt{2}}{2}, -j, \frac{-\sqrt{2}-j\sqrt{2}}{2}$$

and having a phase ramp equal to 7π/4.

When utilizing a unified linear array antenna layout (e.g., as shown in FIG. 5), DFT precoders may be more effective at times that the antennas (e.g., the antennas 502*a*, 502*b*, 502*c*, 502*d*) have no phase error across the Tx ports. That is, when the initial phase of the antennas is properly calibrated or aligned, the DFT precoders may be more effective. However, with phase misalignment or phase offset/error, DFT precoders may not be the most effective precoder. Instead, precoders that do not follow a DFT matrix structure (e.g., as shown in FIG. 6) may be more effective. A DFT matrix that does not follow a DFT matrix are referred herein as non-DFT precoders. Such precoders may also be referred to by other names than a non-DFT precoder.

Figures 7A, 7B:
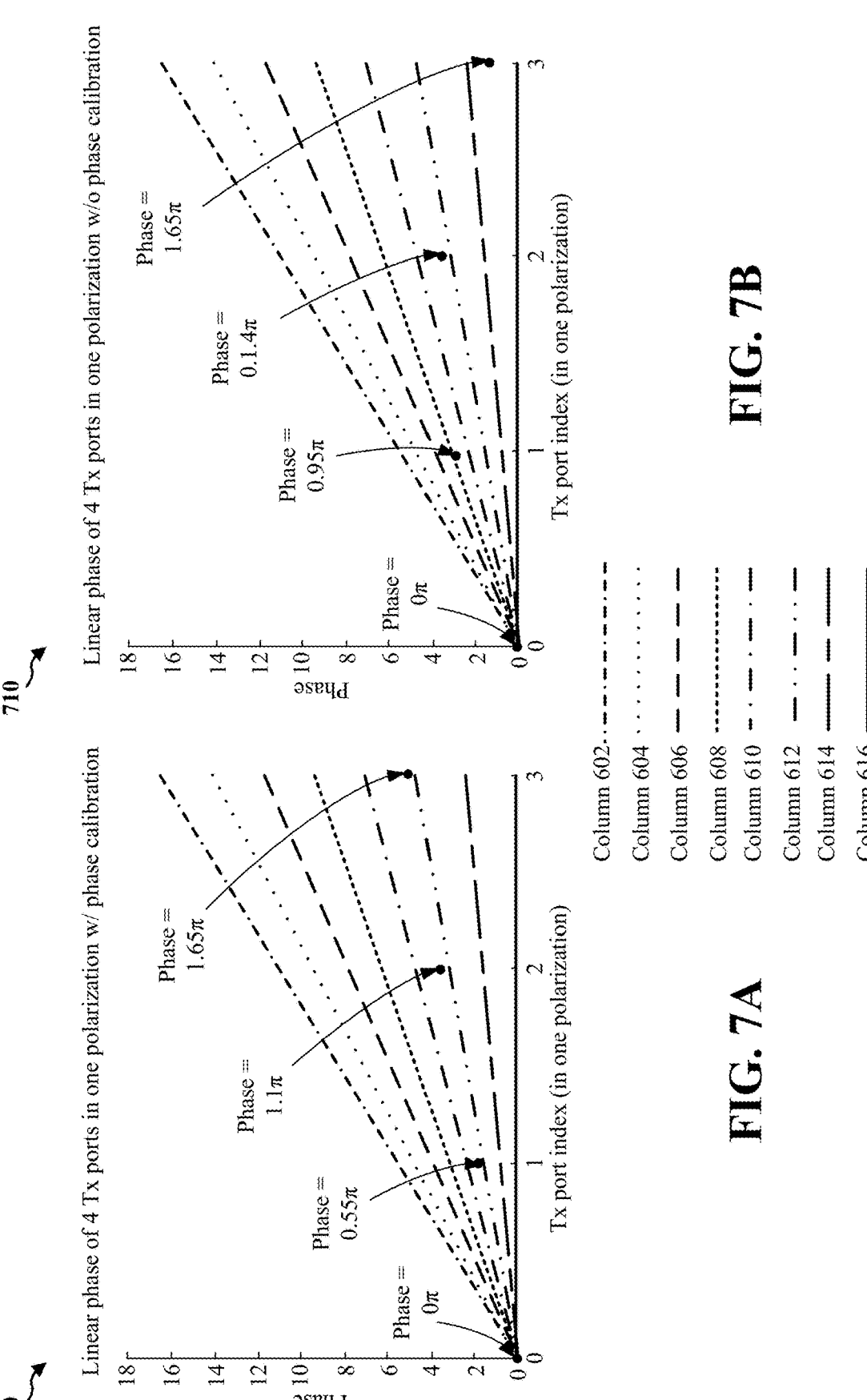
FIG. 7A illustrates a graph including a plurality of phase ramps in which there is no phase error.
FIG. 7B illustrates a graph including a plurality of phase ramps in which there is phase error.

A network (the network node 450) may select a precoder for any given UE based on an estimate of the uplink channel. The network may determine the channel estimate based on the SRS signals transmitted by the UE, for example. The network may determine the phases observed by the UE based on the determined estimate of the uplink channel and may select a precoder based on the determined phases. For instance, FIG. 7A illustrates a graph 700 including a plurality of phase ramps in which there is no (or relatively low) phase error. Each of the phase ramps corresponds to a particular column of the DFT-based codebook illustrated in FIG. 6. For instance, a first phase ramp corresponds to the first column 602, a second phase ramp corresponds to the second column 604, a third phase ramp corresponds to the third column 606, a fourth phase ramp corresponds to the fourth column 608, a fifth phase ramp corresponds to the fifth column 610, a sixth phase ramp corresponds to the sixth column 612, a seventh phase ramp corresponds to the seventh column 614, and an eight phase ramp corresponds to the eighth column 616. The network quantizes the measured phases and selects the precoder corresponding to the phase ramp that is closest to the quantized measured phases. As shown in FIG. 7A, the measured phases follow the phase ramp corresponding to the third column 606, as there is no phase error across the Tx ports of the UE. Accordingly, the network selects the DFT precoder corresponding to the third column 606.

FIG. 7B illustrates a graph 710 including the plurality of phase ramps in which there is phase error. As shown in FIG. 7B, the measured phases do not follow any of the phase ramps due to phase error. Accordingly, none of the DFT precoders are effective for precoding.

Aspects of the present disclosure provide for methods and apparatus for a hybrid codebook that includes both DFT precoders and non-DFT precoders. By supporting both types of precoders, the network may more effectively select a precoder based on whether a phase offset or error at a particular UE exists. For instance, if no (or relatively low) phase offset or error exists, then the network may select a DFT precoder from the hybrid codebook. However, if a relatively high phase offset or error exists, then the network may select a non-DFT precoder from the hybrid codebook. A wireless device (e.g., a network node or a UE) may precode data for transmission based on the precoder selected from the hybrid codebook and transmit a signal based on the precoded data. The methods and apparatus of aspects of the present disclosure may advantageously improve perfor- mance and spectral efficiency during the transmission of data regardless of phase offset or error.

In particular, aspects of the present disclosure are directed to building a hybrid codebook and communicating using the hybrid codebook, which includes precoders (or codepoints) from both a DFT matrix (or codebook) and precoders that are not from a DFT matrix (e.g., precoders from a non-DFT matrix).

The hybrid codebook can be built using various tech- niques. For example, suppose a hybrid codebook of size N is to be generated. Initially, a size M DFT codebook having a size less than the size of the codebook (e.g., M<N) may be selected (e.g., as an initial basis for the hybrid codebook). That is, an M number of DFT precoders from the DFT-based codebook may be selected. The size M DFT codebook may have an oversampling factor of 1, meaning that there is no oversampling. Next, N-M non-DFT precoders from a non- DFT precoder set may be included (e.g., added) into the hybrid codebook. The set of non-DFT precoders may include all or a subset of non-DFT precoders where each entry of the precoders is a phase-shift keying (PSK) con- stellation point (e.g., each entry of the precoders may be a quadrature phase-shift keying (QPSK) constellation point, an 8PSK constellation point, a 16PSK constellation point, etc.). That is, all or a subset of the set of non-DFT precoders correspond to a PSK constellation point (e.g., a QPSK constellation point, an 8PSK constellation point, a 16PSK constellation point, etc.).

The N-M non-DFT precoders may be determined utilizing various techniques. For example, in one aspect, each of the N-M non-DFT precoders may be added one-by-one to the hybrid codebook, such that the newly-added precoder ($P_k$) is the precoder that has the largest minimum Chordal distance to the precoders already included in the hybrid codebook. The N-M non-DFT precoders may be determined in such a manner in accordance with Equation 1, which is provided below:

$$k = \text{argmax}_{1 \leq k \leq K} \{\min_{1 \leq l \leq L} \text{Chordal distance}\{P_k, P_l\}\} \qquad \text{Eq. 1}$$

where K represents the number of precoders in the non-DFT precoder set, and L represents the number of precoders included in the hybrid codebook. In accordance with Equa- tion 1, a first non-DFT precoder (represented by k) in the set K of non-DFT precoders is selected, and the chordal dis- tance from the first non-DFT precoder and each of the precoders in the hybrid codebook is determined. It is noted that initially the hybrid codebook includes an M number of DFT precoders. Accordingly, the distance between the first non-DFT precoder each of the M DFT precoders may be determined. After determining each of the chordal distances, the minimum (or smallest) chordal distance may be deter- mined. The foregoing process is then performed for each of the other non-DFT precoders in the set K of non-DFT precoders, where a chordal distance is determined between a respective non-DFT precoder in the set K of non-DFT precoders and each of the M DFT precoders. The minimum chordal distance for each of the other respective non-DFT precoders is also determined. Thereafter, each of the deter- mined minimum chordal distances are compared to deter- mine the largest of the minimum chordal distances. The non-DFT precoder associated with the largest minimum chordal distance is added to the hybrid codebook. The foregoing process is then repeated until an N-M number of non-DFT precoders are added to the hybrid codebook, where the remaining non-DFT precoders in the set K of non-DFT precoders are analyzed to determine the largest minimum chordal distance with respect to the precoders (both DFT precoders and non-DFT precoders) included in the hybrid codebook. It is noted that while the techniques described above utilize a chordal distance-based technique to deter- mine a distance between precoders, other techniques may be utilized to determine the distances between precoders.

In another aspect, the N-M non-DFT precoders may be included based on a frequency of use of such precoders when DFT precoders are not being utilized. For instance, an empirical analysis (e.g., simulations, field observations, etc.) may be performed to determine which non-DFT precoders are most-frequently used within the set K of non-DFT precoders. The top N-M frequently-used non-DFT precoders may be added to the hybrid codebook.

Figure 8:
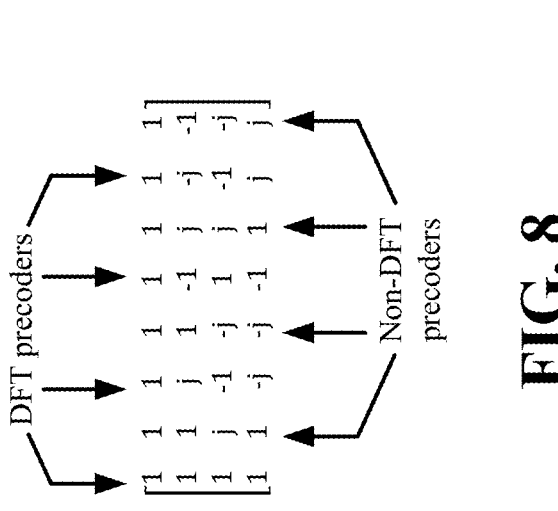
FIG. 8 illustrates a diagram of a hybrid codebook, in accordance with various aspects of the present disclosure.

FIG. 8 illustrates a diagram 800 of a hybrid codebook in accordance with various aspects of the present disclosure. As shown in FIG. 8, the hybrid codebook includes 8 precoders. In particular, the hybrid codebook includes 4 DFT precoders (located in the first, third, fifth, and seventh columns) and 4 non-DFT precoders (located in the second, fourth, sixth, and eighth columns). In accordance with the aspects of the present disclosure described above, 4 DFT precoders are used as the initial basis for the hybrid codebook, and the 4 non-DFT precoders are subsequently included in the hybrid codebook (e.g., either by being added one-by-one based on their respective distances (e.g., chordal distances) to the precoders already in the hybrid codebook or by being added based on their frequency of use).

In some aspects, each rank for a particular signal may be associated with a different codebook. For instance, FIG. 9A illustrates a table 900 depicting various types of codebooks used for different ranks in accordance with various aspects of the present disclosure. For example, for a given trans- mission (e.g., an uplink transmission via PUSCH, a down- link transmission via PDSCH, or a sidelink transmission via PSSCH) with R (e.g., 8) layers (also known as Rank R), each rank may utilize a particular codebook. As shown in FIG. 9A, some ranks (e.g., ranks 1, 2, 3, and 4) may utilize a hybrid codebook, and some ranks (e.g., rank 5, 6, 7, and 8) may utilize a non-hybrid codebook, such as a pure DFT codebook (e.g., a codebook that only includes DFT precod- ers, as shown for rank 5, as an example), or a pure non-DFT codebook (e.g., a codebook that only includes non-DFT precoders, as shown for ranks 6, 7, and 8, as an example). As further shown in FIG. 9A, while certain ranks may utilize the same type of codebook, the codebook may vary in size. For instance, ranks 1, 2, 3, and 4 may utilize a hybrid codebook. However, the hybrid codebook size varies. For instance, the size of the hybrid codebook used for rank 1 is 8 (e.g., 4 DFT precoders plus 4 non-DFT precoders), and the size of the hybrid codebook used for ranks 2, 3, and 4 is 14 (i.e., 8 DFT precoders plus 6 non-DFT precoders).

In another example, as shown in diagram 910 of FIG. 9B, ranks 1 and 5 may utilize a non-hybrid codebook, such as a pure DFT codebook, ranks 2, 3, and 4 may utilize a hybrid codebook, and ranks 6, 7, and 8 may utilize a non-hybrid codebook, such as a pure non-DFT codebook. As further shown in FIG. 9B, while certain ranks may utilize the same type of codebook, the codebook may vary in size. For instance, ranks 2, 3, and 4 may utilize a hybrid codebook. However, the hybrid codebook size varies. For instance, the size of the hybrid codebook used for rank 2 is 16 (e.g., 8 DFT precoders plus 8 non-DFT precoders), and the size of the hybrid codebook used for ranks 3 and 4 is 14 (i.e., 8 DFT precoders plus 6 non-DFT precoders). In another example, ranks 6, 7, and 8 may utilize a non-hybrid codebook including non-DFT precoders. However, the non-hybrid codebook varies. For instance, the size of the non-hybrid codebook used for rank 6 is 2, and the size of the non-hybrid codebook used for ranks 7 and 8 is 1.

In some aspects, the hybrid codebook may be defined (e.g., defined by and incorporated into a wireless standard so that the hybrid codebook is fixed rather than configurable and known to the devices involved in the wireless communication) and/or may be hardcoded in a wireless device. In other aspects, part of the hybrid codebook is defined, and another part of the hybrid codebook is signaled/configured by the network (e.g., by a network node). For instance, the DFT precoders in the hybrid codebook may be defined by and incorporated into a wireless standard, and the non-DFT precoders may be determined and signaled to a UE by the network (e.g., via RRC or MAC-CE). That is, the network may update the non-DFT precoders in the hybrid codebook via signaling, such as RRC or MAC-CE. The network may estimate the UL SRS channel and determine the non-DFT precoders using the techniques described above and signal the non-DFT precoders to the UE. The network may further signal which precoder in the hybrid codebook the UE should use for precoding UL transmissions. For example, the network may signal the precoder to use for precoding in DCI.

Table 2 illustrates an example of an UL 8 Tx size 64 codebook constructed as a hybrid codebook with DFT and non-DFT precoders.

TABLE 2

| | | Constructed Hybrid codebook | |
|---|---|---|---|
| Rank | # precoders | Codebook subset of precoders generated based on first approach | Codebook subset of precoders generated based on second approach |
| Rank 1 | 8 | Size 8: CodebookMode = 1, N1 = 4, N2 = 1, O1 = 1, O2 = 1, , $i_2$ = 0, 1 | Size 0 |
| Rank 2 | 16 | Size 8: CodebookMode = 1, N1 = 4, N2 = 1, O1 = 1, O2 = 1, $i_2$ = 0, 1, $i_{1,3}$ = 0 | Size 8: (matrices below) |

$$\frac{1}{4}\begin{bmatrix} 1 & 1 \\ -j & -j \\ 1 & 1 \\ -j & -j \\ 1 & -1 \\ -j & j \\ j & -j \\ 1 & -1 \end{bmatrix} \frac{1}{4}\begin{bmatrix} 1 & 1 \\ 1 & 1 \\ -j & -j \\ j & j \\ j & -j \\ j & -j \\ -j & j \\ j & -j \end{bmatrix} \frac{1}{4}\begin{bmatrix} 1 & 1 \\ 1 & 1 \\ 1 & 1 \\ j & j \\ j & -j \\ j & -j \\ 1 & -1 \\ j & -j \end{bmatrix}$$

$$\frac{1}{4}\begin{bmatrix} 1 & 1 \\ 1 & 1 \\ 1 & 1 \\ -1 & -1 \\ 1 & -1 \\ 1 & -1 \\ j & -j \\ -j & j \end{bmatrix} \frac{1}{4}\begin{bmatrix} 1 & 1 \\ j & j \\ j & j \\ -1 & -1 \\ 1 & -1 \\ j & -j \\ -1 & 1 \\ -j & j \end{bmatrix} \frac{1}{4}\begin{bmatrix} 1 & 1 \\ 1 & 1 \\ j & j \\ 1 & 1 \\ 1 & -1 \\ 1 & -1 \\ -1 & 1 \\ j & -j \end{bmatrix}$$

$$\frac{1}{4}\begin{bmatrix} 1 & 1 \\ -j & -j \\ -1 & -1 \\ 1 & 1 \\ j & -j \\ 1 & -1 \\ -1 & 1 \\ 1 & -1 \end{bmatrix} \frac{1}{4}\begin{bmatrix} 1 & 1 \\ j & j \\ -1 & -1 \\ 1 & 1 \\ 1 & -1 \\ j & -j \\ -j & j \\ j & -j \end{bmatrix}$$

TABLE 2-continued

|  |  | Constructed Hybrid codebook | |
| --- | --- | --- | --- |
| Rank | # precoders | Codebook subset of precoders generated based on first approach | Codebook subset of precoders generated based on second approach |
| Rank 3 | 14 | Size 8: CodebookMode = 1, N1 = 4, N2 = 1, O1 = 1, O2 = 1, $i_2$ = 0, 1, $i_{1,3}$ = 0 | Size 6: |

$$\frac{1}{\sqrt{24}}\begin{bmatrix} 1 & 1 & 1 \\ 1 & -1 & 1 \\ 1 & 1 & 1 \\ -1 & 1 & -1 \\ j & j & -j \\ j & -j & -j \\ 1 & 1 & -1 \\ -1 & 1 & 1 \end{bmatrix} \quad \frac{1}{\sqrt{24}}\begin{bmatrix} 1 & 1 & 1 \\ 1 & -1 & 1 \\ j & j & j \\ -j & j & -j \\ 1 & 1 & -1 \\ 1 & -1 & -1 \\ -1 & -1 & 1 \\ 1 & -1 & -1 \end{bmatrix}$$

$$\frac{1}{\sqrt{24}}\begin{bmatrix} 1 & 1 & 1 \\ 1 & -1 & 1 \\ 1 & 1 & 1 \\ -1 & 1 & -1 \\ 1 & 1 & -1 \\ 1 & -1 & -1 \\ j & j & -j \\ -j & j & j \end{bmatrix} \quad \frac{1}{\sqrt{24}}\begin{bmatrix} 1 & 1 & 1 \\ -1 & 1 & -1 \\ -1 & -1 & -1 \\ -1 & 1 & -1 \\ j & j & -j \\ -j & j & j \\ -1 & -1 & 1 \\ -1 & 1 & 1 \end{bmatrix}$$

$$\frac{1}{\sqrt{24}}\begin{bmatrix} 1 & 1 & 1 \\ 1 & -1 & 1 \\ -j & -j & -j \\ j & -j & j \\ j & j & -j \\ j & -j & -j \\ -j & -j & j \\ j & -j & -j \end{bmatrix} \quad \frac{1}{\sqrt{24}}\begin{bmatrix} 1 & 1 & 1 \\ 1 & -1 & 1 \\ -1 & -1 & -1 \\ 1 & -1 & 1 \\ j & j & -j \\ j & -j & -j \\ -1 & -1 & 1 \\ 1 & -1 & -1 \end{bmatrix}$$

| Rank 4 | 14 | Size 8: CodebookMode = 1, N1 = 4, N2 = 1, O1 = 1, O2 = 1, $i_2$ = 0, 1, $i_{1,3}$ = 0 | Size 6: |
| --- | --- | --- | --- |

$$\frac{1}{\sqrt{32}}\begin{bmatrix} 1 & 1 & 1 & 1 \\ 1 & -1 & 1 & -1 \\ -j & -j & -j & -j \\ -j & j & -j & j \\ 1 & 1 & -1 & -1 \\ 1 & -1 & -1 & 1 \\ 1 & 1 & -1 & -1 \\ 1 & -1 & -1 & 1 \end{bmatrix}$$

$$\frac{1}{\sqrt{32}}\begin{bmatrix} 1 & 1 & 1 & 1 \\ 1 & -1 & 1 & -1 \\ -1 & -1 & -1 & -1 \\ -1 & 1 & -1 & 1 \\ 1 & 1 & -1 & -1 \\ 1 & -1 & -1 & 1 \\ -j & -j & j & j \\ -j & j & j & -j \end{bmatrix}$$

$$\frac{1}{\sqrt{32}}\begin{bmatrix} 1 & 1 & 1 & 1 \\ 1 & -1 & 1 & -1 \\ -j & -j & -j & -j \\ -j & j & -j & j \\ j & j & -j & -j \\ j & -j & -j & j \\ -j & -j & j & j \\ -j & j & j & -j \end{bmatrix}$$

TABLE 2-continued

| | | Constructed Hybrid codebook | |
|---|---|---|---|
| Rank | # precoders | Codebook subset of precoders generated based on first approach | Codebook subset of precoders generated based on second approach |
| | | | $\frac{1}{\sqrt{32}}\begin{bmatrix} 1 & 1 & 1 & 1 \\ 1 & -1 & 1 & -1 \\ -1 & -1 & -1 & -1 \\ -1 & 1 & -1 & 1 \\ j & j & -j & -j \\ j & -j & -j & j \\ -1 & -1 & 1 & 1 \\ -1 & 1 & 1 & -1 \end{bmatrix}$ |
| | | | $\frac{1}{\sqrt{32}}\begin{bmatrix} 1 & 1 & 1 & 1 \\ 1 & -1 & 1 & -1 \\ 1 & 1 & 1 & 1 \\ 1 & -1 & 1 & -1 \\ 1 & 1 & -1 & -1 \\ 1 & -1 & -1 & 1 \\ j & j & -j & -j \\ j & -j & -j & j \end{bmatrix} \quad \frac{1}{\sqrt{32}}\begin{bmatrix} 1 & 1 & 1 & 1 \\ 1 & -1 & 1 & -1 \\ j & j & j & j \\ j & -j & j & -j \\ j & j & -j & -j \\ j & -j & -j & j \\ j & j & -j & -j \\ j & -j & -j & j \end{bmatrix}$ |
| Rank 5 | 8 | Size 8: CodebookMode = 1, N1 = 4, N2 = 1, O1 = 1, O2 = 1, $i_2$ = 0, 1, $i_{1,3}$ = 0 | Size 0 |
| Rank 6 | 2 | Size 0 | Size 2: $\frac{1}{\sqrt{48}}\begin{bmatrix} 1 & 1 & 1 & 1 & 1 & 1 \\ 1 & 1 & -1 & -1 & 1 & 1 \\ 1 & -1 & 1 & -1 & 1 & -1 \\ 1 & -1 & -1 & 1 & 1 & -1 \\ 1 & 1 & 1 & 1 & -1 & -1 \\ 1 & 1 & -1 & -1 & -1 & -1 \\ 1 & -1 & 1 & -1 & -1 & 1 \\ 1 & -1 & -1 & 1 & -1 & 1 \end{bmatrix}$ |
| | | | $\frac{1}{\sqrt{48}}\begin{bmatrix} 1 & 1 & 1 & 1 & 1 & 1 \\ 1 & 1 & -1 & -1 & 1 & 1 \\ 1 & -1 & 1 & -1 & 1 & -1 \\ 1 & -1 & -1 & 1 & 1 & -1 \\ j & j & j & j & -j & -j \\ j & j & -j & -j & -j & -j \\ j & -j & j & -j & -j & j \\ j & -j & -j & j & -j & j \end{bmatrix}$ |
| Rank 7 | 1 | Size 0 | Size 1: $\frac{1}{\sqrt{56}}\begin{bmatrix} 1 & 1 & 1 & 1 & 1 & 1 & 1 \\ 1 & 1 & -1 & -1 & 1 & 1 & -1 \\ 1 & -1 & 1 & -1 & 1 & -1 & 1 \\ 1 & -1 & -1 & 1 & 1 & -1 & -1 \\ 1 & 1 & 1 & 1 & -1 & -1 & -1 \\ 1 & 1 & -1 & -1 & -1 & -1 & 1 \\ 1 & -1 & 1 & -1 & -1 & 1 & -1 \\ 1 & -1 & -1 & 1 & -1 & 1 & 1 \end{bmatrix}$ |
| Rank 8 | 1 | Size 0 | Size 1: $\frac{1}{8}\begin{bmatrix} 1 & 1 & 1 & 1 & 1 & 1 & 1 & 1 \\ 1 & 1 & -1 & -1 & 1 & 1 & -1 & -1 \\ 1 & -1 & 1 & -1 & 1 & -1 & 1 & -1 \\ 1 & -1 & -1 & 1 & 1 & -1 & -1 & 1 \\ 1 & 1 & 1 & 1 & -1 & -1 & -1 & -1 \\ 1 & 1 & -1 & -1 & -1 & -1 & 1 & 1 \\ 1 & -1 & 1 & -1 & -1 & 1 & -1 & 1 \\ 1 & -1 & -1 & 1 & -1 & 1 & 1 & -1 \end{bmatrix}$ |
| Sum | 64 | | |

Figure 10:
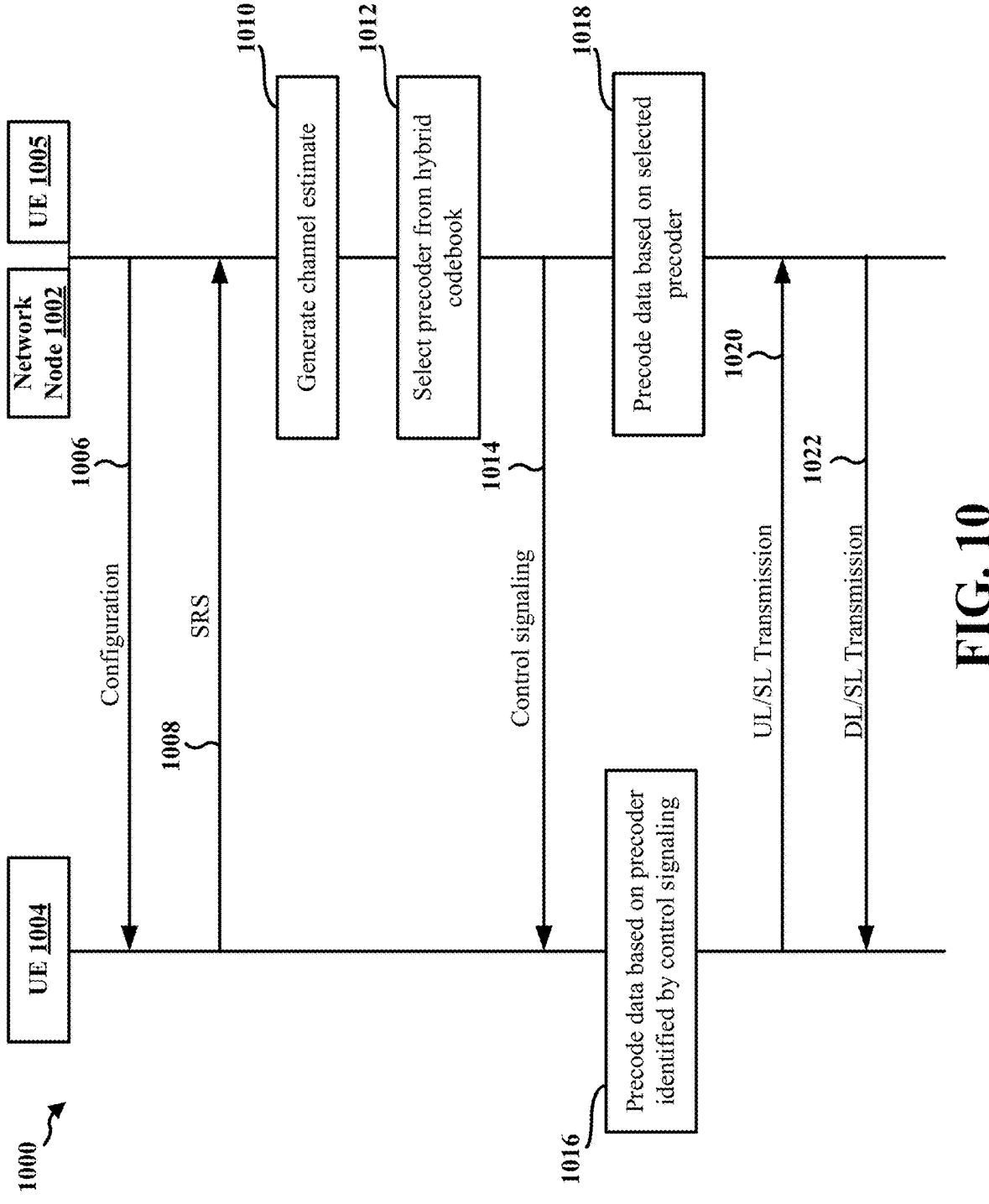
FIG. 10 illustrates a call flow illustrating a method of wireless communication, in accordance with various aspects of the present disclosure.

FIG. 10 is a call flow diagram 1000 illustrating a method of wireless communication between a network node 1002 (or UE 1005) and a UE 1004 in accordance with various aspects of this present disclosure. Although aspects are described for a network node, the aspects may be performed by a network node in aggregation and/or by one or more components of the network node 1002 (e.g., such as a CU 110, a DU 130, and/or an RU 140). As shown in FIG. 10, the network node 1002 or UE 1005 may output a configuration 1006 that is received by the UE 1004. In a configuration in which a network node is providing the configuration 1006, the configuration 1006 may configure the UE 1004 with one or more parameters associated with transmitting an uplink transmission. In a configuration in which a UE is providing the configuration 1006, the configuration 1006 may configure the UE 1004 with one or more parameters associated with transmitting a sidelink transmission. For example, the configuration 1006 may identify one or more sounding reference signal (SRS) resources. Such a configuration may be transmitted via RRC signaling. The configuration 1006 may also indicate non-DFT precoders to be incorporated into a hybrid codebook maintained at the UE 1004. Such control signaling may be transmitted via RRC or MAC-CE.

In one configuration, the hybrid codebook is hardcoded at the network node 1002 or UE 1005 and the UE 1004. In such a configuration, the network node 1002 or UE 1005 does not need to signal the non-DFT precoders to the UE 1004. In another configuration, the non-DFT precoders are dynamically determined by the network node 1002 or UE 1005 utilizing either the distance-based technique or the frequency of use-based technique described above. In such a configuration, the network node 1002 or UE 1005 may signal the determined non-DFT precoders to the UE 1004 via RRC or MAC-CE, as described above.

The UE 1004 may transmit an SRS 1008 that is received by the network node 1002 or UE 1005. The SRS 1008 may be associated with one or more transmit ports of the UE 1004, such as the example antenna elements 402 of FIG. 4. Although the example UE 1004 transmits an SRS, in other examples, the UE 1004 may transmit any other reference signal that may enable the network node 1002 or UE 1005 to estimate channel conditions between the UE 1004 and the network node 1002 or UE 1005.

At 1010, the network node 1002 or UE 1005 uses the SRS 1008 to generate a channel estimate. For example, in a configuration in which the SRS 1008 is provided to a network node, the network node uses the SRS 1008 to generate an uplink channel estimate. In a configuration in which the SRS 1008 is provided to a UE, the UE uses the SRS 1008 to generate a sidelink channel estimate. The network node 1002 or UE 1005 may then, at 1012, select a precoder from the hybrid codebook including both DFT precoders and non-DFT precoders based on the channel estimate.

At 1014, the network node 1002 or UE 1005 may transmit control signaling that is received by the UE 1004. In a configuration in which a network node transmits the control signaling, the control signaling may indicate non-DFT precoders to be incorporated into a hybrid codebook maintained at the UE 1004 and/or a precoder from the hybrid codebook to be used by the UE 1004 for uplink transmissions. In a configuration in which a UE transmits the control signaling, the control signaling may indicate non-DFT precoders to be incorporated into a hybrid codebook maintained at the UE 1004 and/or a precoder from the hybrid codebook to be used by the UE 1004 for sidelink transmissions. The non-DFT precoders may be signaled via RRC or MAC-CE, and the precoder to be used for transmissions may be signaled via DCI.

In one configuration, the hybrid codebook may be hardcoded at the network node 1002 or UE 1005 and the UE 1004. In such a configuration, the network node 1002 or UE 1005 does not signal the non-DFT precoders to the UE 1004. In another configuration, the non-DFT precoders are dynamically determined by the network node 1002 or UE 1005 utilizing either the distance-based technique or the frequency of use-based technique described above. In such a configuration, the network node 1002 or UE 1005 may signal the determined non-DFT precoders to the UE 1004 via RRC or MAC-CE, as described above.

At 1016, the UE 1004 may precode data for transmission based on the precoder identified by the control signaling received at 1014. For example, in a configuration in which the UE 1004 is communicating with a network node, the UE 1004 may precode data for uplink transmission. In a configuration in which the UE 1004 is communicating with another UE, the UE 1004 may precode data for sidelink transmission. Similarly, at 1018, the network node 1002 or UE 1005 may use the precoder selected at 1012 for the exchange of wireless communication with the UE. For example, the network node 1002 or UE 1005 may precode data for transmission based on the precoder selected at 1012. The network node 102 or the UE 1005, may use the indicated precoder to receive precoded data from the UE 1004, as another example. As an example, in a configuration in which a UE 1005 is communicating with UE 1004, the UE 1004 and/or the UE 1005 may precode data for sidelink transmission between the UEs. In a configuration in which a network node 1002 is communicating with the UE 1004, the network node may precode data for downlink transmission.

At 1020, the UE 1004 may transmit a signal based on the data precoded at 1016 to the network node 1002 or UE 1005. For example, in a configuration in which the UE 1004 is communicating with a network node, the UE 1004 may transmit an uplink signal to the network node based on the data precoded at 1016. In a configuration in which the UE 1004 is communicating with a UE, the UE 1004 may transmit a sidelink signal to the UE based on the data precoded at 1016.

At 1022, the network node 1002 or UE 1005 transmits a signal based on the data precoded at 1018 to the UE 1004. For example, in a configuration in which a network node is communicating with the UE 1004, the network node may provide a downlink signal to the UE 1004 based on the data precoded at 1018. In a configuration in which a UE is communicating with the UE 1004, the UE may provide a sidelink signal to the UE 1004 based on the data precoded at 1018.

Figure 11:
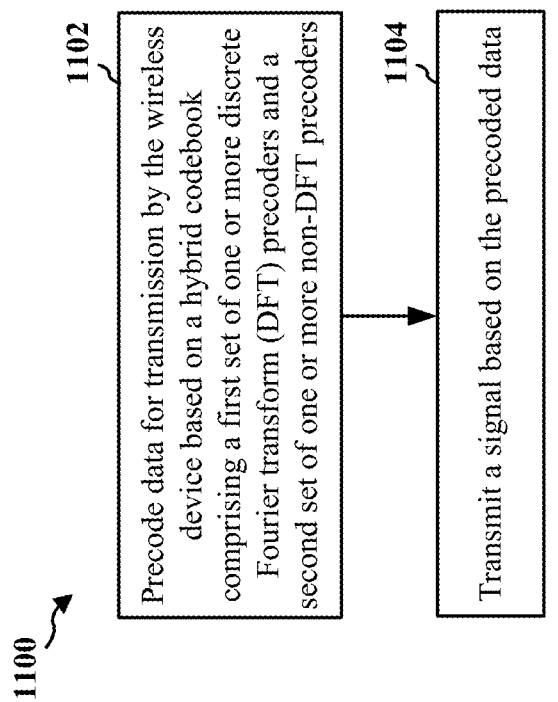
FIG. 11 is a flowchart illustrating methods of wireless communication at a wireless device, in accordance with various aspects of the present disclosure.

FIG. 11 is a flowchart 1100 illustrating methods of wireless communication at a wireless device in accordance with various aspects of the present disclosure. In one configuration, the method may be performed by a UE. The UE may be the UE 104, 350, 400, 1004, 1005, or the apparatus 1304 in the hardware implementation of FIG. 13. In another configuration, the method may be performed by a network node. The network node may be a base station, or a component of a base station, in the access network of FIG. 1 or a core network component (e.g., base station 102, 310; network node 450 or 1002; or the network entity 1302 in the hardware implementation of FIG. 13).

At 1102, the wireless device may precode data for transmission based on a hybrid codebook including a first set of one or more DFT precoders and a second set of one or more non-DFT precoders. For example, referring to FIG. 10, the wireless device (e.g., the network node 1002 or UE 1005 or the UE 1004) may precode data for transmission based on a hybrid codebook at 1016 or 1018. In some aspects, 1102 may be performed by the component 198 (e.g., in a configuration in which the wireless device is a UE) or the component 199 (e.g., in a configuration in which the wireless device is a network node).

In some aspects, the hybrid codebook may have a size N and the first set of the one or more DFT precoders has a size M, where M is less than N, and the second set of the one or more non-DFT precoders may include an N-M number of non-DFT precoders. For example, referring to FIG. 10, the hybrid codebook utilized by the network node 1002 or UE 1005 or the UE 1004 may have a size N and the first set of the one or more DFT precoders has a size M, where M is less than N, and the second set of the one or more non-DFT precoders may include an N-M number of non-DFT precoders.

In some aspects, the N-M number of the non-DFT precoders may be based on a distance relative to at least the first set of one or more DFT precoders. For example, referring to FIG. 10, the N-M number of the non-DFT precoders of the hybrid codebook utilized by the network node 1002 or UE 1005 or the UE 1004 may be based on a distance relative to at least the set of one or more DFT precoders in the hybrid codebook. In the example shown in FIG. 10, the network node 1002 or UE 1005 may determine the N-M number of the non-DFT precoders to include in the hybrid codebook based on a distance relative to precoders already included in the hybrid codebook.

In some aspects, the distance is a chordal distance. For example, referring to FIG. 10, the N-M number of the non-DFT precoders of the hybrid codebook utilized by the network node 1002 or UE 1005 or the UE 1004 may be based on a chordal distance relative to at least the set of one or more DFT precoders in the hybrid codebook. In the example shown in FIG. 10, the network node 1002 or UE 1005 may determine the N-M number of the non-DFT precoders to include in the hybrid codebook based on a chordal distance relative to precoders already included in the hybrid codebook.

In one aspect, the N-M non-DFT precoders may be added one by one into the hybrid codebook. As described above, the hybrid codebook may initially include one or more DFT precoders. When adding the first non-DFT precoder, the first non-DFT precoder may be selected based on a distance (e.g., chordal distance) relative to all precoders in the hybrid codebook, which initially includes only the first set of one or more DFT precoders. However, when adding a second non-DFT precoder, the second non-DFT precoder is selected based on the distance relative to all precoders in the hybrid codebook, which now includes the first set of one or more DFT precoders and the already-added first non-DFT precoder. When a third non-DFT precoders is added, the third non-DFT precoder is selected based on the distance relative to all precoders in the hybrid codebook, which now includes the first set of one or more DFT precoders and the already-added the first and second non-DFT precoders.

In some aspects, the N-M number of the non-DFT precoders may be frequently used precoders from a plurality of non-DFT precoders. For example, referring to FIG. 10, the N-M number of the non-DFT precoders of the hybrid codebook utilized by the network node 1002 or UE 1005 or the UE 1004 may be frequently used precoders (e.g., the top most-frequently precoders) from a plurality of non-DFT precoders. In the example shown in FIG. 10, the network node 1002 or UE 1005 may include N-M number of the non-DFT precoders in the hybrid codebook that are the most-frequently used.

In some aspects, each non-DFT precoder in the second set of the one or more non-DFT precoders may be based on a third set of one or more non-DFT precoders, and a subset of the third set may correspond to a PSK constellation point. For example, referring to FIG. 10, each non-DFT precoder in the second set of the one or more non-DFT precoders of the hybrid codebook utilized by the network node 1002 or UE 1005 and the UE 1004 may be based on a third set of one or more non-DFT precoders, and a subset of the third set may correspond to a PSK constellation point.

In some aspects, the PSK constellation point may include one of a QPSK constellation point, an 8PSK constellation point, or a 16PSK constellation point. For example, referring to FIG. 10, each non-DFT precoder in the second set of the one or more non-DFT precoders of the hybrid codebook utilized by the network node 1002 or UE 1005 and the UE 1004 may be based on a third set of one or more non-DFT precoders, and a subset of the third set may correspond to one of a QPSK constellation point, an 8PSK constellation point, or a 16PSK constellation point.

In some aspects, each non-DFT precoder in the second set of the one or more non-DFT precoders may be based on a third set of one or more non-DFT precoders, and all of the third set may correspond to a PSK constellation point. For example, referring to FIG. 10, each non-DFT precoder in the second set of the one or more non-DFT precoders of the hybrid codebook utilized by the network node 1002 or UE 1005 and the UE 1004 may be based on a third set of one or more non-DFT precoders, and all of the third set may correspond to a PSK constellation point.

In some aspects, the PSK constellation point may include one of a QPSK constellation point, an 8PSK constellation point, or a 16PSK constellation point. For example, referring to FIG. 10, each non-DFT precoder in the second set of the one or more non-DFT precoders of the hybrid codebook utilized by the network node 1002 or UE 1005 and the UE 1004 may be based on a third set of one or more non-DFT precoders, and all of the third set may correspond to one of a QPSK constellation point, an 8PSK constellation point, or a 16PSK constellation point.

In some aspects, the hybrid codebook may be associated with a rank for the signal, and the hybrid codebook may be associated with a first set of ranks and a non-hybrid codebook is associated with a second set of ranks. For example, referring to FIG. 10, the hybrid codebook utilized by the network node 1002 or UE 1005 and the UE 1004 may be associated with a rank for the signal, and the hybrid codebook may be associated with a first set of ranks and a non-hybrid codebook is associated with a second set of ranks. As shown in FIG. 9A, the hybrid codebook is associated with ranks 1, 2, 3, and 4, and a non-hybrid codebook is associated with ranks 5, 6, 7, and 8.

In some aspects, the second set of ranks may include higher ranks than the first set of ranks. For example, referring to FIG. 9A, the second set of ranks (e.g., ranks 5, 6, 7, and 8) are higher ranks than the first set of ranks (e.g., ranks 1, 2, 3, and 4).

In some aspects, a first subset of the second set of ranks may be associated with a DFT codebook, and a second subset of the second set of ranks may be associated with a non-DFT codebook. For, example, referring to FIG. 9A, a first subset of the second set of ranks (e.g., rank 5) is associated with a DFT codebook, and a second subset of the second set of ranks (e.g., ranks 6, 7, and 8) are associated with a non-DFT codebook.

In some aspects, the hybrid codebook may be defined and known to the wireless device. For example, the hybrid codebook may be defined in a wireless standard. For example, referring to FIG. 10, the hybrid codebook utilized by the network node 1002 or UE 1005 and the UE 1004 may be defined and known to the wireless device (e.g., the hybrid codebook is hardcoded at the network node 1002 or UE 1005 and the UE 1004 and/or defined by or incorporated by a wireless standard).

In some aspects, a first subset of precoders for the hybrid codebook is fixed and the indication of a second subset of precoders for the hybrid codebook is received or transmitted. For example, referring to FIG. 10, in a configuration in which a network node provides the control signaling 1014 to the UE 1004, the UE 1004 may receive an indication via the control signaling 1014 that indicates a second subset of precoders for the hybrid codebook. In a configuration in which a UE provides the control signaling 1014 to the UE 1004, the UE may transmit an indication via the control signaling 1014 that indicates a second subset of precoders for the hybrid codebook.

In some aspects, the first subset of precoders may include the first set of one or more DFT precoders, and the second subset of precoders may include the second set of one or more non-DFT precoders. For example, referring to FIG. 10, the first subset of precoders of the hybrid codebook utilized by the network node 1002 or UE 1005 and the UE 1004 may include the set of one or more DFT precoders, and the second subset of precoders of the hybrid codebook utilized by the network node 1002 or UE 1005 and the UE 1004 may include the set of one or more non-DFT precoders.

In some aspects, the indication may be received or transmitted via RRC signaling or a MAC-SE. For example, referring to FIG. 10, in a configuration in which the UE 1004 receives the configuration 1006 from the network node 1002 or UE 1005, the indication may be received via RRC signaling or a MAC-SE.

In some aspects, where the wireless device is a network node, an uplink SRS may be received, and receiving or transmitting the indication includes transmitting the indication to a UE indicating the second subset of precoders based on a measurement of the uplink SRS. For example, referring to FIG. 10, the network node 1002 may receive SRS 1008 and transmit the indication to a UE, via the control signaling 1014, indicating the second subset of precoders based on a measurement of the uplink SRS 1008.

In some aspects, where the wireless device is a UE, an uplink SRS may be transmitted, and receiving or transmitting the indication may include receiving the indication from a network node indicating the second subset of precoders based on the uplink SRS. For example, referring to FIG. 10, the UE 1004 may transmit SRS 1008 and receive the indication from the network node or UE, via the control signaling 1014, indicating the second subset of precoders based on a measurement of the uplink SRS 1008.

In some aspects, where the wireless device is a UE, the UE may transmit an SRS and may receive an indication of a precoder from among the first set of one or more DFT precoders and the second set of one or more non-DFT precoders of the hybrid codebook based on the SRS, where precoding the data may include precoding the data with the precoder indicated by the indication. For example, referring to FIG. 10, the UE 1004 may transmit SRS 1008 and receive an indication of a precoder from among the first set of one or more DFT precoders and the second set of one or more non-DFT precoders of the hybrid codebook based on the SRS via control signaling 1014. The UE 1004 may precode the data at 1016 based on the precoder indicated by the indication.

In some aspects, where the wireless device is a network node, the network node may receive an SRS and may provide an indication of a precoder from among the first set of one or more DFT precoders and the second set of one or more non-DFT precoders of the hybrid codebook based on the SRS, where precoding the data may include precoding the data with the precoder indicated by the indication. For example, referring to FIG. 10, the network node 1002 may receive SRS 1008 and provide an indication of a precoder from among the first set of one or more DFT precoders and the second set of one or more non-DFT precoders of the hybrid codebook based on the SRS via control signaling 1014. The network node 1002 may precode the data based on the precoder indicated by the indication.

At 1104, the wireless device may transmit a signal based on the precoded data. For example, referring to FIG. 10, the wireless device (e.g., the network node 1002 or UE 1005 or the UE 1004) may transmit a signal based on a hybrid codebook at 1020 or 1022. In some aspects, 1104 may be performed by the component 198 (e.g., in a configuration in which the wireless device is a UE) or the component 199 (e.g., in a configuration in which the wireless device is a network node).

In some aspects, transmitting the signal based on the precoded data includes transmitting one of an uplink transmission, a downlink transmission, or a sidelink transmission. For example, referring to FIG. 10, in a configuration in which the UE 1004 transmits the signal to a network node at 1022, the signal is an uplink transmission. In a configuration in which the UE 1004 transmits the signal to another UE at 1022, the signal is a sidelink transmission. In a configuration in which a network node transmits the signal to the UE 1004 at 1022, the signal is a downlink transmission. In a configuration in which a UE transmits the signal to the UE 1004 at 1022, the signal is a sidelink transmission.

Figure 12:
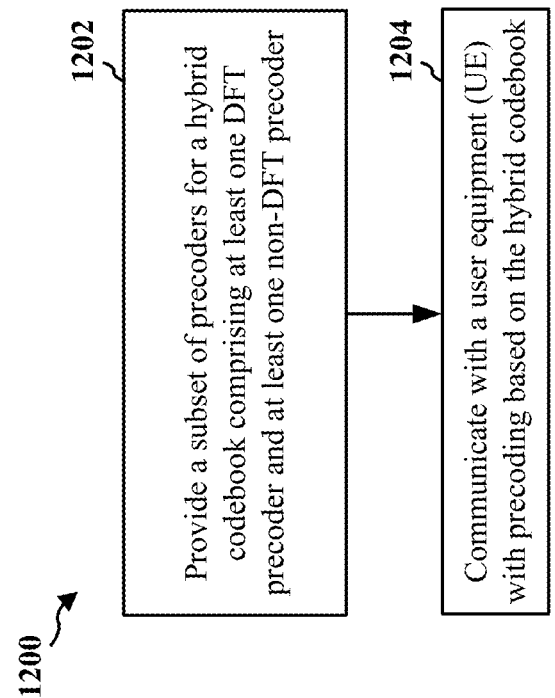
FIG. 12 is a flowchart illustrating methods of wireless communication at a network node, in accordance with various aspects of the present disclosure

FIG. 12 is a flowchart 1200 illustrating methods of wireless communication at a network node in accordance with various aspects of the present disclosure. The network node may be a base station, or a component of a base station, in the access network of FIG. 1 or a core network component (e.g., base station 102, 310; network node 450, 1002; or the network entity 1302 in the hardware implementation of FIG. 13).

As shown in FIG. 12, at 1202, the network node may provide a subset of precoders for a hybrid codebook including at least one DFT precoder and at least one non-DFT precoder. For example, referring to FIG. 10, the network node 1002 may provide a subset of precoders for a hybrid codebook including at least one DFT precoder and at least one non-DFT precoder via control signaling 1014. In some aspects, 1202 may be performed by the component 199.

In some aspects, the hybrid codebook may include a fixed set of DFT precoders, and the subset of precoders provided by the network node may include the at least one non-DFT precoder. For example, referring to FIG. 10, the hybrid codebook utilized by the network node 1002 may include a fixed set of DFT precoders, and the subset of precoders provided by the network node may include the at least one non-DFT precoder.

In some aspects, the hybrid codebook may have a size N and may include M DFT precoders, where M is less than N, and the hybrid codebook may include an N-M number of non-DFT precoders. The network node may select the N-M number of non-DFT precoders by adding each precoder from the N-M number of precoders one at a time, such that a newly-added precoder from the N-M number of precoders has a largest minimum chordal distance to at least the M DFT precoders. For example, referring to FIG. 10, the hybrid codebook utilized by the network node 1002 may have a size N and may include M DFT precoders, where M is less than N, and the hybrid codebook may include an N-M number of non-DFT precoders. The network node 1002 may select the N-M number of non-DFT precoders by adding each precoder from the N-M number of precoders one at a time, such that a newly-added precoder from the N-M number of precoders has a largest minimum distance to at least the M DFT precoders.

In some aspects, the distance is a chordal distance. For example, referring to FIG. 10, the network node 1002 may select the N-M number of non-DFT precoders by adding each precoder from the N-M number of precoders one at a time, such that a newly-added precoder from the N-M number of precoders has a largest minimum chordal distance to at least the M DFT precoders. Referring to FIG. 1 described above, In some aspects, the at least one non-DFT precoder may be based on frequency of use in comparison to a plurality of non-DFT precoders. For example, referring to FIG. 10, the at least one non-DFT precoder of the hybrid codebook utilized by the network node 1002 may be based on frequency of use in comparison to a plurality of non-DFT precoders.

At 1204, the network node may communicate with a UE with precoding based on the hybrid codebook. For example, referring to FIG. 10, the network node 1002 may precode data based on the hybrid codebook at 1018 and communicate with the UE 1004 at 1022. In some aspects, 1204 may be performed by the component 199.

Figure 13:
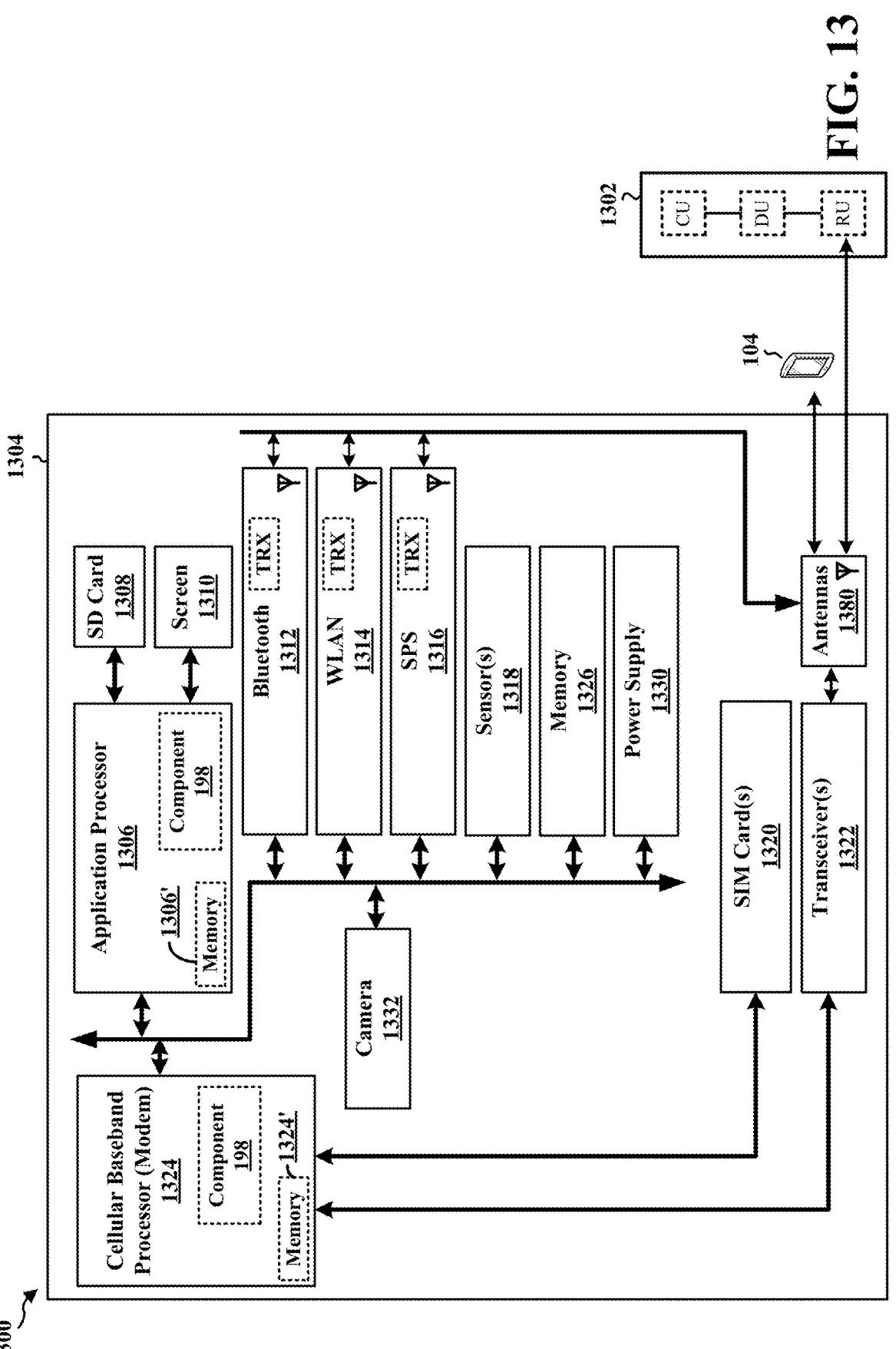
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include a at least one cellular baseband processor 1324 (also referred to as a modem) coupled to one or more transceivers 1322 (e.g., cellular RF transceiver). The cellular baseband processor 1324 may include at least one on-chip memory 1324'. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor 1324 communicates through the transceiver(s) 1322 via one or more antennas 1380 with the UE 104 and/or with an RU associated with a network entity 1302. The cellular baseband processor 1324 and the application processor 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor 1324 and the application processor 1306 are each responsible for general processing, including the execution of software stored on the computer-readable medium/memory. The software, when executed by the cellular baseband processor 1324/application processor 1306, causes the cellular baseband processor 1324/application processor 1306 to perform the various functions described supra. The cellular baseband processor(s) 1324 and the application processor(s) 1306 are configured to perform the various functions described supra based at least in part of the information stored in the memory. That is, the cellular baseband processor(s) 1324 and the application processor(s) 1306 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1324/application processor(s) 1306 when executing software. The cellular baseband processor(s) 1324/application processor(s) 1306 may be a component of the UE 350 and may include the at least one memory 360 and/or at least one of the TX processor 368, the RX processor 356, and the controller/processor 359. In one configuration, the apparatus 1304 may be at least one processor chip (modem and/or application) and include just the cellular baseband processor(s) 1324 and/or the application processor(s) 1306, and in another configuration, the apparatus 1304 may be the entire UE (e.g., see UE 350 of FIG. 3) and include the additional modules of the apparatus 1304.

As discussed supra, the component 198 may be configured to precode data for transmission by the wireless device based on a hybrid codebook including a first set of one or more DFT precoders and a second set of one or more non-DFT precoders and to transmit a signal based on the precoded data. The component 198 may be further configured to receive or transmit an indication of a second subset of precoders for the hybrid codebook. The component 198 may be further configured to receive or transmit the indication via RRC signaling or a MAC-CE. The component 198 may be further configured to transmit an uplink SRS, wherein to receive or transmit the indication, the at least one processor is configured to receive the indication from a network node indicating the second subset of precoders based on the uplink SRS. The component 198 may be further configured to transmit a SRS; and receive an indication of a precoder from among the first set of one or more DFT precoders and the second set of one or more non-DFT precoders of the hybrid codebook based on the SRS, wherein to precode the data, the at least one processor is configured to precode the data with the precoder indicated by the indication. The component 198 may be within the cellular baseband processor 1324, the application processor 1306, or both the cellular baseband processor 1324 and the application processor 1306. The component 198 may be one or more hardware components specifically configured to carry out the stated processes/algorithm, implemented by one or more processors configured to perform the stated processes/ algorithm, stored within a computer-readable medium for implementation by one or more processors, or some combination thereof. When multiple processors are implemented, the multiple processors may perform the stated processes/algorithm individually or in combination. As shown, the apparatus 1304 may include a variety of components configured for various functions. In one configuration, the apparatus 1304, and in particular the cellular baseband processor 1324 and/or the application processor 1306, includes means for precoding data for transmission by the wireless device based on a hybrid codebook including a first set of one or more DFT precoders and a second set of one or more non-DFT precoders and means for transmitting a signal based on the precoded data. apparatus 1304 may further include means for receiving or transmitting an indication of a second subset of precoders for the hybrid codebook. The apparatus 1304 may further include means for receiving or transmitting the indication via RRC signaling or a MAC-CE. The apparatus 1304 may further include means for transmitting an uplink SRS, and means for receiving the indication from a network node indicating the second subset of precoders based on the uplink SRS. The apparatus 1304 may further include means for transmitting transmit a SRS; and means for receiving an indication of a precoder from among the first set of one or more DFT precoders and the second set of one or more non-DFT precoders of the hybrid codebook based on the SRS, the means for precoding precode the data with the precoder indicated by the indication. The means may be the component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
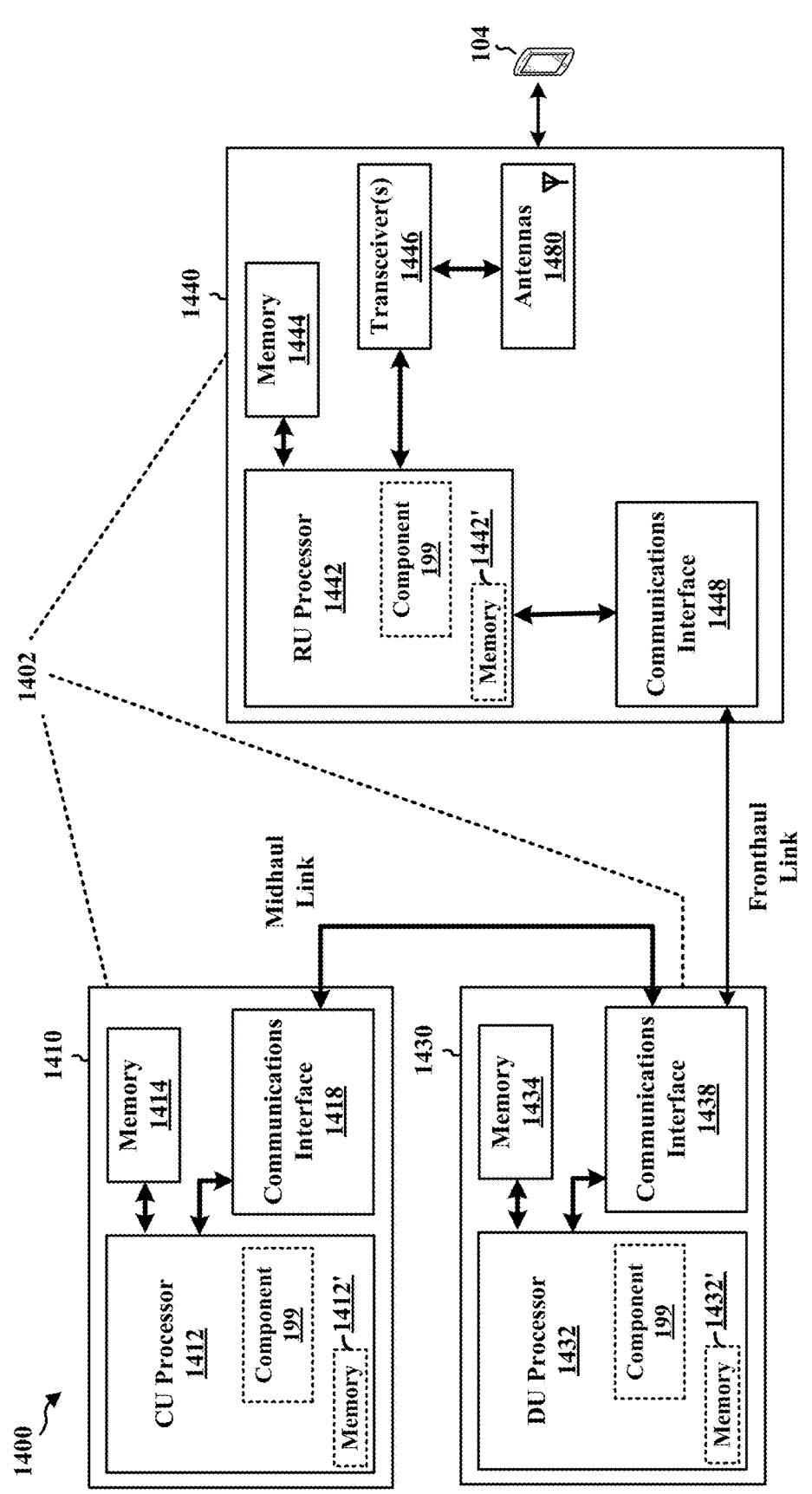
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include at least one CU processor 1412. The CU processor 1412 may include at least one on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include at least one DU processor 1432. The DU processor 1432 may include at least one on-chip memory 1432'. In some aspects, the DU 1430 may further include additional memory modules 1434 and a communications interface 1438. The DU 1430 communicates with the RU 1440 through a fronthaul link. The RU 1440 may include at least one RU processor 1442. The RU processor 1442 may include at least one on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, in some aspects, the component 199 may be configured to precode data for transmission by the wireless device based on a hybrid codebook including a first set of one or more DFT precoders and a second set of one or more non-DFT precoders and to transmit a signal based on the precoded data. The component 199 may be further configured to receive or transmit an indication of a second subset of precoders for the hybrid codebook. The component 199 may be further configured to receive or transmit the indication via RRC signaling or a MAC-CE. The component 199 may be further configured to receive an uplink SRS, wherein to receive or transmit the indication, the at least one processor is configured to transmit the indication to a UE indicating the second subset of precoders based on a measurement of the uplink SRS. The component 198 may be further configured to receive a SRS; and provide an indication of a precoder from among the first set of one or more DFT precoders and the second set of one or more non-DFT precoders of the hybrid codebook based on the SRS, wherein to precode the data, the at least one processor is configured to precode the data with the precoder indicated by the indication. In other aspects, the component 199 is configured to provide a subset of precoders for a hybrid codebook including at least one DFT precoder and at least one non-DFT precoder and to communicate with a user equipment (UE) with precoding based on the hybrid codebook. In some aspects, the hybrid codebook may have a size N and includes M DFT precoders, where M is less than N, and wherein the hybrid codebook includes an N-M number of non-DFT precoders, and the component 199 may be further configured to select the N-M number of non-DFT precoders by adding each precoder from the N-M number of non-DFT precoders one at a time, such that a newly-added precoder from the N-M number of non-DFT precoders has a largest minimum distance to at least the M DFT precoders. The component 199 may be within one or more processors of one or more of the CU 1410, DU 1430, and the RU 1440. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1402 may include a variety of components configured for various functions. In one configuration, the network entity 1402 may include means for precoding data for transmission by the wireless device based on a hybrid codebook including a first set of one or more DFT precoders and a second set of one or more non-DFT precoders and means for transmitting a signal based on the precoded data. The network entity 1402 may further include means for receiving or transmitting an indication of a second subset of precoders for the hybrid codebook. The network entity 1402 may further include means for receiving or transmitting the indication via RRC signaling or a MAC-CE. The network entity 1402 may further include means for receiving an uplink SRS, wherein the means for transmitting the indication are configured to transmit the indication to a UE indicating the second subset of precoders based on a measurement of the uplink SRS. The network entity 1402 may further include means for receiving a SRS and means for providing an indication of a precoder from among the first set of one or more DFT precoders and the second set of one or more non-DFT precoders of the hybrid codebook based on the SRS, wherein the means for precoding precode the data with the precoder indicated by the indication. In another configuration, the network entity 1402 includes means for providing a subset of precoders for a hybrid codebook including at least one DFT precoder and at least one non-DFT precoder and means for communicating with a UE with precoding based on the hybrid codebook. In some aspects, the hybrid codebook may have a size N and includes M DFT precoders, where M is less than N, and wherein the hybrid codebook includes an N-M number of non-DFT precoders, and the network entity 1402 may further include means for selecting the N-M number of non-DFT precoders by adding each precoder from the N-M number of non-DFT precoders one at a time, such that a newly-added precoder from the N-M number of non-DFT precoders has a largest minimum distance to at least the M DFT precoders. The means may be the component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

Aspects of the present disclosure provide for methods and apparatus for a hybrid codebook that utilizes both DFT precoders and non-DFT precoders. By supporting both types of precoders, the network may optimally select a precoder based on whether a phase offset or error at a particular UE exists. For instance, if no (or relatively low) phase offset or error exists, then the network may select a DFT precoder from the hybrid codebook. However, if a relatively high phase offset or error exists, then the network may select a non-DFT precoder from the hybrid codebook. A wireless device (e.g., a network node or a UE) may precode data for transmission based on the precoder selected from the hybrid codebook and transmit a signal based on the precoded data. The methods and apparatus of aspects of the present disclosure may advantageously improve performance and spectral efficiency during the transmission of data regardless of phase offset or error.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a wireless device, the method including precoding data for transmission by the wireless device based on a hybrid codebook including a first set of one or more DFT precoders and a second set of one or more non-DFT precoders and transmitting a signal based on the precoded data.

Aspect 2 is the method of aspect 1, where transmitting the signal based on the precoded data includes transmitting one of an uplink transmission, a downlink transmission, or a sidelink transmission.

Aspect 3 is the method of any of aspects 1 and 2, where the hybrid codebook has a size N and the first set of the one or more DFT precoders has a size M, where M is less than N, and where the second set of the one or more non-DFT precoders includes an N-M number of non-DFT precoders.

Aspect 4 is the method of aspect 3, where the N-M number of the non-DFT precoders are based on a distance relative to at least the first set of one or more DFT precoders.

Aspect 5 is the method of aspect 4, where the distance is a chordal distance.

Aspect 6 is a method of aspect 3, where the N-M number of the non-DFT precoders are frequently used precoders from a plurality of non-DFT precoders.

Aspect 7 is a method of any of aspects 1 to 6, where each non-DFT precoder in the second set of the one or more non-DFT precoders is based on a third set of one or more non-DFT precoders, and where a subset of the third set corresponds to a PSK constellation point.

Aspect 8 is a method of aspect 7, where the PSK constellation point includes one of a QPSK constellation point, an 8PSK constellation point, or a 16PSK constellation point.

Aspect 9 is a method of any of aspects 1 to 6, where each non-DFT precoder in the second set of the one or more non-DFT precoders is based on a third set of one or more non-DFT precoders, and where all of the third set corresponds to a PSK constellation point.

Aspect 10 is a method of any of aspects 1 to 9, where the hybrid codebook is associated with a rank for the signal, and where the hybrid codebook is associated with a first set of ranks and a non-hybrid codebook is associated with a second set of ranks.

Aspect 11 is a method of aspect 10, where the second set of ranks includes higher ranks than the first set of ranks.

Aspect 12 is a method of any of aspects 1 to 11, where a first subset of the second set of ranks is associated with a DFT codebook, and a second subset of the second set of ranks is associated with a non-DFT codebook.

Aspect 13 is a method of any of aspects 1 to 12, where the hybrid codebook is defined and known to the wireless device.

Aspect 14 is a method of any of aspects 1 to 12, where a first subset of precoders for the hybrid codebook is fixed, the method further including receiving or transmitting an indication of a second subset of precoders for the hybrid codebook.

Aspect 15 is a method of aspect 14, where the first subset of precoders includes the first set of one or more DFT precoders, and the second subset of precoders includes the second set of one or more non-DFT precoders.

Aspect 16 is a method of aspect 14, where the indication is received or transmitted via RRC signaling or a MAC-CE.

Aspect 17 is a method of aspect 14, where the wireless device includes a network node, the method further including receiving an uplink SRS, where receiving or transmitting the indication includes transmitting the indication to a UE indicating the second subset of precoders based on a measurement of the uplink SRS.

Aspect 18 is a method of aspect 14, where the wireless device includes a UE, the method further including transmitting an uplink SRS, where receiving or transmitting the indication includes receiving the indication from a network node indicating the second subset of precoders based on the uplink SRS.

Aspect 19 is a method of aspects 1 to 16, where the wireless device includes a UE, the method further including transmitting an SRS, and receiving an indication of a precoder from among the first set of one or more DFT precoders and the second set of one or more non-DFT precoders of the hybrid codebook based on the SRS, where precoding the data includes precoding the data with the precoder indicated by the indication.

Aspect 20 is a method of aspects 1 to 16, where the wireless device includes a network node, the method further including receiving an SRS, and providing an indication of a precoder from among the first set of one or more DFT precoders and the second set of one or more non-DFT precoders of the hybrid codebook based on the SRS, where precoding the data includes precoding the data with the precoder indicated by the indication.

Aspect 21 is a method of wireless communication at a network node, the method including providing a subset of precoders for a hybrid codebook including at least one DFT precoder and at least one non-DFT precoder and communicating with a UE with precoding based on the hybrid codebook.

Aspect 22 is a method of aspect 21, where the hybrid codebook includes a fixed set of DFT precoders, and the subset of precoders provided by the network node includes the at least one non-DFT precoder.

Aspect 23 is a method of aspect 22, where the hybrid codebook has a size N and includes M DFT precoders, where M is less than N, and where the hybrid codebook includes an N-M number of non-DFT precoders, the method further including selecting the N-M number of non-DFT precoders by adding each precoder from the N-M number of non-DFT precoders one at a time, such that a newly-added precoder from the N-M number of non-DFT precoders has a largest minimum distance to at least the M DFT precoders.

Aspect 24 is a method of aspect 23, where the distance is a chordal distance.

Aspect 25 is a method of aspect 22, where the at least one non-DFT precoder is based on frequency of use in comparison to a plurality of non-DFT precoders.

Aspect 26 is an apparatus for wireless communication at a wireless device. The apparatus includes memory; and at least one processor coupled to the memory and, based at least in part on information stored in the memory, the at least one processor is configured to implement any of aspects 1 to 20.

Aspect 27 is an apparatus for wireless communication at a wireless device. The apparatus includes memory; and at least one processor coupled to the memory and, based at least in part on information stored in the memory, the at least one processor is configured, individually or in any combination, to cause the wireless device to implement any of aspects 1 to 20.

Aspect 28 is an apparatus for wireless communication at a wireless device. The apparatus includes one or more memories; and one or more processors coupled to the one or more memories and, based at least in part on information stored in the one or more memories, the one or more processors are configured, individually or in any combination, to cause the wireless device to implement any of aspects 1 to 20.

Aspect 29 is an apparatus of any of aspects 26-28, further including at least one of a transceiver or an antenna coupled to the at least one processor or one or more processors.

Aspect 30 is an apparatus for wireless communication at a network node. The apparatus includes memory; and at least one processor coupled to the memory and, based at least in part on information stored in the memory, the at least one processor is configured to implement any of aspects 21 to 25.

Aspect 31 is an apparatus for wireless communication at a network node. The apparatus includes memory; and at least one processor coupled to the memory and, based at least in part on information stored in the memory, the at least one processor is configured, individually or in any combination, to cause the network node to implement any of aspects 21 to 25.

Aspect 32 is an apparatus for wireless communication at a network node. The apparatus includes one or more memories; and one or more processors coupled to the one or more memories and, based at least in part on information stored in the one or more memories, the one or more processors are configured, individually or in any combination, to cause the network node to implement any of aspects 21 to 25.

Aspect 33 is an apparatus of any of aspects 30-32, further including at least one of a transceiver or an antenna coupled to the at least one processor or one or more processors.

Aspect 34 is an apparatus for wireless communication including means for implementing any of aspects 1 to 20.

Aspect 35 is an apparatus for wireless communication including means for implementing any of aspects 21 to 25.

Aspect 36 is a computer-readable medium (e.g., a non-transitory computer-readable medium) storing computer executable code, the code when executed by at least one processor causes the at least one processor to implement any of aspects 1 to 20.

Aspect 37 is a computer-readable medium (e.g., a non-transitory computer-readable medium) storing computer executable code at a wireless device, the code when executed by at least one processor causes the wireless device to implement any of aspects 1 to 20.

Aspect 38 is a computer-readable medium (e.g., a non-transitory computer-readable medium) storing computer executable code, the code when executed by at least one processor causes the at least one processor to implement any of aspects 21 to 25.

Aspect 39 is a computer-readable medium (e.g., a non-transitory computer-readable medium) storing computer executable code at a network node, the code when executed by at least one processor causes the network node to implement any of aspects 21 to 25.

What is claimed is:

1. An apparatus for wireless communication at a wireless device, comprising:
memory; and
at least one processor coupled to the memory and, based at least in part on information stored in the memory, the at least one processor is configured to cause the wireless device to:
precode data for transmission by the wireless device based on a hybrid codebook comprising a first set of one or more discrete Fourier transform (DFT) precoders and a second set of one or more non-DFT precoders, wherein the second set of one or more non-DFT precoders is included in the hybrid codebook based on at least one of:
a distance relative to the first set of one or more DFT precoders, or
a frequency of use of the second set of one or more non-DFT precoders among a plurality of non-DFT precoders; and
transmit a signal based on the precoded data.

2. The apparatus of claim 1, wherein to transmit the signal based on the precoded data, the at least one processor is configured to cause the wireless device to transmit one of an uplink transmission, a downlink transmission, or a sidelink transmission, and wherein the second set of one or more non-DFT precoders includes a subset of the plurality of non-DFT precoders that have a largest minimum chordal distance to the first set of one or more DFT precoders among the plurality of non-DFT precoders.

3. The apparatus of claim 1, wherein the hybrid codebook has a size N and the first set of one or more DFT precoders has a size M, where M is less than N, and
wherein the second set of one or more non-DFT precoders includes an N-M number of non-DFT precoders.

4. The apparatus of claim 3, wherein the N-M number of non-DFT precoders are based on the distance relative to the first set of one or more DFT precoders.

5. The apparatus of claim 4, wherein the distance is a chordal distance.

6. The apparatus of claim 3, wherein the N-M number of non-DFT precoders are frequently used precoders from the plurality of non-DFT precoders.

7. The apparatus of claim 1, wherein each non-DFT precoder in the second set of one or more non-DFT precoders is based on a third set of one or more non-DFT precoders, and wherein a subset of the third set of one or more non-DFT precoders corresponds to a phase-shift keying (PSK) constellation point.

8. The apparatus of claim 7, wherein the PSK constellation point comprises one of:
a quadrature PSK (QPSK) constellation point;
an 8PSK constellation point; or
a 16PSK constellation point.

9. The apparatus of claim 1, wherein each non-DFT precoder in the second set of one or more non-DFT precoders is based on a third set of one or more non-DFT precoders, and wherein all of the third set of one or more non-DFT precoders corresponds to a phase-shift keying (PSK) constellation point.

10. The apparatus of claim 1, wherein the hybrid codebook is associated with a rank for the signal, and wherein the hybrid codebook is associated with a first set of ranks and a non-hybrid codebook is associated with a second set of ranks.

11. The apparatus of claim 10, wherein the second set of ranks comprises higher ranks than the first set of ranks.

12. The apparatus of claim 10, wherein a first subset of the second set of ranks is associated with a DFT codebook, and a second subset of the second set of ranks is associated with a non-DFT codebook.

13. The apparatus of claim 1, wherein the hybrid codebook is defined and known to the wireless device.

14. The apparatus of claim 1, wherein a first subset of precoders for the hybrid codebook is fixed, the at least one processor further configured to cause the wireless device to:
receive or transmit an indication of a second subset of precoders for the hybrid codebook.

15. The apparatus of claim 14, wherein the first subset of precoders comprises the first set of one or more DFT precoders, and the second subset of precoders comprises the second set of one or more non-DFT precoders.

16. The apparatus of claim 14, wherein the at least one processor is configured to cause the wireless device to receive or transmit the indication via radio resource control (RRC) signaling or a medium access control-control element (MAC-CE).

17. The apparatus of claim 14, wherein the wireless device comprises a network node, and the at least one processor is further configured to cause the network node to:
  receive an uplink sounding reference signal (SRS), wherein to receive or transmit the indication, the at least one processor is configured to cause the network node to transmit the indication to a user equipment (UE) indicating the second subset of precoders based on a measurement of the uplink SRS.

18. The apparatus of claim 14, wherein the wireless device comprises a user equipment (UE), and the at least one processor is further configured to cause the UE to:
  transmit an uplink sounding reference signal (SRS), wherein to receive or transmit the indication, the at least one processor is configured to cause the UE to receive the indication from a network node indicating the second subset of precoders based on the uplink SRS.

19. The apparatus of claim 1, wherein the wireless device comprises a user equipment (UE), and the at least one processor is further configured to cause the UE to:
  transmit a sounding reference signal (SRS); and
  receive an indication of a precoder from among the first set of one or more DFT precoders and the second set of one or more non-DFT precoders of the hybrid codebook based on the SRS, wherein to precode the data, the at least one processor is configured to cause the UE to precode the data with the precoder indicated by the indication.

20. The apparatus of claim 1, wherein the wireless device comprises a network node, and the at least one processor is further configured to cause the network node to:
  receive a sounding reference signal (SRS); and
  provide an indication of a precoder from among the first set of one or more DFT precoders and the second set of one or more non-DFT precoders of the hybrid codebook based on the SRS, wherein to precode the data, the at least one processor is configured to cause the network node to precode the data with the precoder indicated by the indication.

21. An apparatus for wireless communication at a network node, comprising:
  memory; and
  at least one processor coupled to the memory and, based at least in part on information stored in the memory, the at least one processor is configured to:
    provide a subset of precoders for a hybrid codebook comprising at least one DFT precoder and at least one non-DFT precoder, wherein the at least one non-DFT precoder is included in the hybrid codebook based on at least one of:
      a distance relative to the at least one DFT precoder, or
      a frequency of use of the at least one non-DFT precoder among a plurality of non-DFT precoders; and
    communicate with a user equipment (UE) with precoding based on the hybrid codebook.

22. The apparatus of claim 21, wherein the hybrid codebook comprises a fixed set of DFT precoders, and the subset of precoders provided by the network node comprises the at least one non-DFT precoder.

23. The apparatus of claim 22, wherein the hybrid codebook has a size N and includes M DFT precoders, where M is less than N, and wherein the hybrid codebook includes an N-M number of non-DFT precoders, and the at least one processor is further configured to cause the network node to:
  select the N-M number of non-DFT precoders by adding each precoder from the N-M number of non-DFT precoders one at a time, such that a newly-added precoder from the N-M number of non-DFT precoders has a largest minimum distance to at least the M DFT precoders.

24. The apparatus of claim 23, wherein the largest minimum distance is based on a chordal distance.

25. The apparatus of claim 22, wherein the at least one non-DFT precoder is based on the frequency of use in comparison to the plurality of non-DFT precoders.

26. A method of wireless communication at a wireless device, comprising:
  precoding data for transmission by the wireless device based on a hybrid codebook comprising a first set of one or more discrete Fourier transform (DFT) precoders and a second set of one or more non-DFT precoders, wherein the second set of one or more non-DFT precoders is included in the hybrid codebook based on at least one of:
    a distance relative to the first set of one or more DFT precoders, or
    a frequency of use of the second set of one or more non-DFT precoders among a plurality of non-DFT precoders; and
  transmitting a signal based on the precoded data.

27. The method of claim 26, wherein transmitting the signal based on the precoded data includes transmitting one of an uplink transmission, a downlink transmission, or a sidelink transmission, and wherein the second set of one or more non-DFT precoders includes a subset of the plurality of non-DFT precoders that have a largest minimum chordal distance to the first set of one or more DFT precoders among the plurality of non-DFT precoders.

28. The method of claim 26, wherein the hybrid codebook has a size N and the first set of one or more DFT precoders has a size M, where M is less than N, and wherein the second set of one or more non-DFT precoders includes an N-M number of non-DFT precoders, and the N-M number of non-DFT precoders are based on the distance relative to the first set of one or more DFT precoders, or wherein the N-M number of non-DFT precoders are frequently used precoders from the plurality of non-DFT precoders.

29. The method of claim 26, wherein each non-DFT precoder in the second set of one or more non-DFT precoders is based on a third set of one or more non-DFT precoders, and wherein all of the third set of one or more non-DFT precoders corresponds to a phase-shift keying (PSK) constellation point, or wherein the hybrid codebook is associated with a rank for the signal, and wherein the hybrid codebook is associated with a first set of ranks and a non-hybrid codebook is associated with a second set of ranks.

30. A method of wireless communication at a network node, comprising:
  providing a subset of precoders for a hybrid codebook comprising at least one DFT precoder and at least one non-DFT precoder, wherein the at least one non-DFT precoder is included in the hybrid codebook based on at least one of:

a distance relative to the at least one DFT precoder, or a frequency of use of the at least one non-DFT precoder among a plurality of non-DFT precoders; and communicating with a user equipment (UE) with precoding based on the hybrid codebook.

\* \* \* \* \*